(12) United States Patent
Popovic

(10) Patent No.: US 8,483,521 B2
(45) Date of Patent: Jul. 9, 2013

(54) CAVITY DYNAMICS COMPENSATION IN RESONANT OPTICAL MODULATORS

(75) Inventor: Milos Popovic, Boulder, CO (US)

(73) Assignee: Massachusetts Institute of Technology, Cambridge, MA (US)

( * ) Notice: Subject to any disclaimer, the term of this patent is extended or adjusted under 35 U.S.C. 154(b) by 344 days.

(21) Appl. No.: 12/790,408

(22) Filed: May 28, 2010

(65) Prior Publication Data

US 2010/0303122 A1 Dec. 2, 2010

Related U.S. Application Data

(60) Provisional application No. 61/182,632, filed on May 29, 2009.

(51) Int. Cl.
- *G02F 1/295* (2006.01)
- *G02B 6/26* (2006.01)
- *G02B 6/42* (2006.01)

(52) U.S. Cl.
USPC .......... 385/4; 385/5; 385/15; 385/25; 385/31; 385/32; 385/50

(58) Field of Classification Search
USPC ...................................... 385/4, 32
See application file for complete search history.

(56) References Cited

U.S. PATENT DOCUMENTS

| | | |
|---|---|---|
| 3,558,213 A | 1/1971 | Marcatili |
| 4,142,775 A | 3/1979 | Ramaswamy et al. |
| 4,679,893 A | 7/1987 | Ramer |
| 4,781,424 A | 11/1988 | Kawachi et al. |
| 4,852,117 A | 7/1989 | Po |
| 5,241,616 A | 8/1993 | Garcia |
| 5,371,817 A | 12/1994 | Revelli, Jr. et al. |
| 5,418,868 A | 5/1995 | Cohen et al. |
| 5,592,500 A | 1/1997 | Shirasaki |
| 5,625,403 A | 4/1997 | Hazman |
| 5,900,637 A | 5/1999 | Smith |
| 6,025,943 A | 2/2000 | Meekers et al. |
| 6,031,957 A | 2/2000 | Suzuki et al. |
| 6,052,495 A | 4/2000 | Little et al. |
| 6,157,765 A | 12/2000 | Bruce et al. |
| 6,289,151 B1 | 9/2001 | Kazarinov et al. |
| 6,351,575 B1 | 2/2002 | Gampp et al. |
| 6,389,203 B1 | 5/2002 | Jordan et al. |
| 6,411,752 B1 | 6/2002 | Little et al. |
| 6,442,311 B1 | 8/2002 | Barbarossa et al. |
| 6,480,644 B1 | 11/2002 | MacDonald |

(Continued)

FOREIGN PATENT DOCUMENTS

| | | |
|---|---|---|
| EP | 0646832 A2 | 4/1995 |
| EP | 0726627 | 8/1996 |

(Continued)

OTHER PUBLICATIONS

Altug et al., "Ultrafast Photonic Crystal Nanocavity Laser," Nature Physics 2 (2006) pp. 484-488.

(Continued)

*Primary Examiner* — Ryan Lepisto
(74) *Attorney, Agent, or Firm* — Goodwin Procter LLP

(57) ABSTRACT

Disclosed are resonant optical modulators, and methods of use thereof, that achieve constant photon populations in the resonator by simultaneously modulating at least two variable modulation parameters.

29 Claims, 12 Drawing Sheets

U.S. PATENT DOCUMENTS

| | | |
|---|---|---|
| 6,529,277 B1 | 3/2003 | Weitekamp |
| 6,563,631 B2 | 5/2003 | Delprat et al. |
| 6,636,669 B1 | 10/2003 | Chin et al. |
| 6,668,006 B1 | 12/2003 | Margalit et al. |
| 6,668,111 B2 | 12/2003 | Tapalian et al. |
| 6,690,871 B2 | 2/2004 | Lee et al. |
| 6,711,200 B1 | 3/2004 | Scherer et al. |
| 6,829,269 B2 | 12/2004 | Goodhue et al. |
| 6,834,141 B1 | 12/2004 | Sidick |
| 6,839,482 B2 | 1/2005 | Margalit |
| 6,847,750 B1 | 1/2005 | Baumann et al. |
| 6,891,996 B2 | 5/2005 | Sercel et al. |
| 6,947,632 B2 | 9/2005 | Fischer |
| 6,970,619 B2 * | 11/2005 | Baumann et al. ............... 385/25 |
| 7,062,126 B2 | 6/2006 | Kersey et al. |
| 7,102,469 B2 | 9/2006 | Kim et al. |
| 7,110,632 B2 | 9/2006 | Abeles |
| 7,123,800 B2 | 10/2006 | Kaplan |
| 7,145,660 B2 | 12/2006 | Margalit et al. |
| 7,149,378 B2 | 12/2006 | Baumann et al. |
| 7,164,838 B2 | 1/2007 | Blauvelt et al. |
| 7,171,076 B2 | 1/2007 | Shibata |
| 7,200,308 B2 | 4/2007 | Hochberg et al. |
| 7,215,848 B2 | 5/2007 | Tan et al. |
| 7,292,751 B2 | 11/2007 | Popovic |
| 7,339,724 B2 | 3/2008 | Hochberg et al. |
| 7,424,192 B2 | 9/2008 | Hochberg et al. |
| 7,446,880 B2 | 11/2008 | Vollmer et al. |
| 7,450,811 B2 | 11/2008 | Hashimoto |
| 7,539,375 B2 | 5/2009 | Popovic |
| 7,583,874 B2 | 9/2009 | Rakich et al. |
| 7,643,714 B2 | 1/2010 | Hochberg et al. |
| 7,693,369 B2 | 4/2010 | Fan et al. |
| 7,853,108 B2 | 12/2010 | Popovic et al. |
| 7,903,909 B2 | 3/2011 | Popovic |
| 7,920,770 B2 | 4/2011 | Holzwarth et al. |
| 7,973,265 B2 | 7/2011 | Chu et al. |
| 8,019,185 B2 | 9/2011 | Yap |
| 8,032,027 B2 | 10/2011 | Popovic |
| 2001/0040681 A1 | 11/2001 | Paiam et al. |
| 2001/0046344 A1 | 11/2001 | Hayashi et al. |
| 2002/0039470 A1 | 4/2002 | Braun et al. |
| 2002/0067540 A1 | 6/2002 | Delprat et al. |
| 2002/0076149 A1 | 6/2002 | Deacon |
| 2002/0076188 A1 | 6/2002 | Kimerling et al. |
| 2002/0081055 A1 | 6/2002 | Painter et al. |
| 2002/0122648 A1 | 9/2002 | Mule' et al. |
| 2002/0136481 A1 | 9/2002 | Mule' et al. |
| 2002/0172466 A1 | 11/2002 | Baumann et al. |
| 2002/0181829 A1 | 12/2002 | Margalit et al. |
| 2003/0015770 A1 | 1/2003 | Talin et al. |
| 2003/0016907 A1 | 1/2003 | LoCascio et al. |
| 2003/0021301 A1 | 1/2003 | Vahala et al. |
| 2003/0068134 A1 * | 4/2003 | Gunn, III ............... 385/50 |
| 2003/0128905 A1 | 7/2003 | Kambe et al. |
| 2003/0128922 A1 | 7/2003 | Kolodziejski et al. |
| 2003/0138178 A1 | 7/2003 | Kimerling et al. |
| 2003/0152323 A1 | 8/2003 | Wakabayashi et al. |
| 2003/0156659 A1 | 8/2003 | Margalit et al. |
| 2003/0174974 A1 | 9/2003 | Yasuda et al. |
| 2003/0210860 A1 | 11/2003 | Margalit |
| 2003/0219052 A1 | 11/2003 | Goodhue et al. |
| 2004/0008942 A1 | 1/2004 | Scheuer et al. |
| 2004/0008968 A1 | 1/2004 | Lee et al. |
| 2004/0013355 A1 | 1/2004 | Margalit |
| 2004/0042726 A1 | 3/2004 | Kersey et al. |
| 2004/0056243 A1 | 3/2004 | Atanackovic et al. |
| 2004/0114899 A1 | 6/2004 | Mattsson |
| 2004/0146431 A1 | 7/2004 | Scherer et al. |
| 2004/0156580 A1 | 8/2004 | Baumann et al. |
| 2004/0161188 A1 | 8/2004 | Su et al. |
| 2004/0197051 A1 | 10/2004 | Sercel et al. |
| 2004/0264905 A1 | 12/2004 | Blauvelt et al. |
| 2005/0029536 A1 | 2/2005 | Sugitatsu et al. |
| 2005/0036737 A1 | 2/2005 | Stuart |
| 2005/0058396 A1 | 3/2005 | Tormen et al. |
| 2005/0068602 A1 | 3/2005 | Tormen et al. |
| 2005/0077526 A1 | 4/2005 | Shin et al. |
| 2005/0147348 A1 | 7/2005 | Grunnet-Jepsen et al. |
| 2005/0163418 A1 | 7/2005 | Wong et al. |
| 2005/0169566 A1 | 8/2005 | Takahashi |
| 2005/0196103 A1 | 9/2005 | Kaplan |
| 2005/0255619 A1 | 11/2005 | Negro et al. |
| 2005/0259937 A1 | 11/2005 | Whaley et al. |
| 2005/0275921 A1 | 12/2005 | Haus et al. |
| 2006/0008272 A1 | 1/2006 | Abeles |
| 2006/0029325 A1 | 2/2006 | Fardi et al. |
| 2006/0034569 A1 | 2/2006 | Shih et al. |
| 2006/0083456 A1 | 4/2006 | Burns et al. |
| 2006/0134535 A1 | 6/2006 | Porque |
| 2006/0198566 A1 | 9/2006 | Watts |
| 2006/0222038 A1 | 10/2006 | Yamazaki |
| 2006/0227331 A1 | 10/2006 | Vollmer et al. |
| 2006/0239614 A1 | 10/2006 | Montgomery et al. |
| 2006/0274995 A1 | 12/2006 | Lee et al. |
| 2006/0291791 A1 | 12/2006 | Hochberg et al. |
| 2007/0003283 A1 | 1/2007 | Feuer et al. |
| 2007/0035800 A1 | 2/2007 | Hochberg et al. |
| 2007/0133934 A1 | 6/2007 | Blauvelt et al. |
| 2007/0211992 A1 | 9/2007 | Chu et al. |
| 2007/0230867 A1 | 10/2007 | Chen et al. |
| 2007/0237460 A1 | 10/2007 | Fan et al. |
| 2007/0253663 A1 | 11/2007 | Keyser et al. |
| 2008/0002992 A1 | 1/2008 | Hochberg et al. |
| 2008/0007817 A1 | 1/2008 | Hochberg et al. |
| 2008/0013876 A1 | 1/2008 | Gill et al. |
| 2008/0014534 A1 | 1/2008 | Barwicz et al. |
| 2008/0044184 A1 | 2/2008 | Popovic |
| 2008/0166095 A1 | 7/2008 | Popovic et al. |
| 2008/0199123 A1 | 8/2008 | Pan et al. |
| 2008/0266639 A1 | 10/2008 | Melloni et al. |
| 2008/0273835 A1 | 11/2008 | Popovic |
| 2009/0022445 A1 | 1/2009 | Hochberg et al. |
| 2009/0028492 A1 | 1/2009 | Wu et al. |
| 2009/0028567 A1 | 1/2009 | Socci et al. |
| 2009/0032805 A1 | 2/2009 | Tan et al. |
| 2009/0087137 A1 | 4/2009 | Doan |
| 2009/0116788 A1 | 5/2009 | Rakich et al. |
| 2009/0142019 A1 | 6/2009 | Popovic |
| 2009/0220228 A1 | 9/2009 | Popovic |
| 2009/0239323 A1 | 9/2009 | Tan et al. |
| 2009/0256136 A1 | 10/2009 | Tan et al. |
| 2009/0274418 A1 | 11/2009 | Holzwarth et al. |
| 2009/0290835 A1 | 11/2009 | Popovic |
| 2009/0314763 A1 | 12/2009 | Chu et al. |
| 2010/0002994 A1 | 1/2010 | Baehr-Jones et al. |
| 2010/0158429 A1 | 6/2010 | Popovic |
| 2010/0209038 A1 | 8/2010 | Popovic et al. |
| 2011/0026879 A1 | 2/2011 | Popovic et al. |
| 2011/0158584 A1 | 6/2011 | Popovic |

FOREIGN PATENT DOCUMENTS

| | | |
|---|---|---|
| EP | 0909963 A1 | 4/1999 |
| EP | 1024378 A2 | 8/2000 |
| EP | 1241497 A2 | 9/2002 |
| EP | 1717616 A1 | 11/2006 |
| EP | 1785771 A2 | 5/2007 |
| JP | 2001-194160 A | 7/2001 |
| WO | WO-85/01123 | 3/1985 |
| WO | WO-00/50938 A1 | 8/2000 |
| WO | WO-01/23955 A2 | 4/2001 |
| WO | WO-01/55814 A2 | 8/2001 |
| WO | WO-01/88580 A1 | 11/2001 |
| WO | WO-01/96913 | 12/2001 |
| WO | WO-02/17004 | 2/2002 |
| WO | WO-02/063389 A1 | 8/2002 |
| WO | WO-02/101421 A1 | 12/2002 |
| WO | WO-03/036841 A1 | 5/2003 |
| WO | WO-03/043247 A2 | 5/2003 |
| WO | WO-2005/010618 A2 | 2/2005 |
| WO | WO-2005/036793 | 4/2005 |
| WO | WO-2005/104147 A2 | 11/2005 |
| WO | WO-2005/106551 | 11/2005 |
| WO | WO-2006/025760 A2 | 3/2006 |
| WO | WO-2006/076585 A2 | 7/2006 |
| WO | WO-2007/067165 | 6/2007 |
| WO | WO-2007/084600 | 7/2007 |

| WO | WO-2007/086888 | 8/2007 |
| WO | WO-2008/005061 | 1/2008 |
| WO | WO-2009/017769 | 2/2009 |

OTHER PUBLICATIONS

Badolato et al., "Deterministic Coupling of Single Quantum Dots to Single Nanocavity Modes," Science 308 (2005) pp. 1158-1161.
Baehr-Jones et al., "High-Q Ring Resonators in Thin Silicon-on-Insulator," 85 Appl. Phys. Lett. 16 (Oct. 2004) pp. 3346-3347.
Barbarossa et al., "Novel Double-Ring Optical-Guided-Wave Vernier Resonator," 144 IEE Proc.-Optoelectron. 4, pp. 203-208 (Aug. 1997).
Barbarossa et al., "Theoretical Analysis of Triple-Coupler Ring-Based Optical Guided-Wave Resonator," 13 J. Lightwave Tech. 2, pp. 148-157 (Feb. 1995).
Barbarossa et al., "Triple-Coupler Ring-Based Optical Guided-Wave Resonator," 30 IEEE Electronics Lett. 2, pp. 131-133 (Jan. 20, 1994).
Barwicz et al., "Polarization-transparent microphotonic devices in the Strong Confinement Limit," Nature Photonics 1, pp. 57-60 (Jan. 2007).
Barwicz, "3D analysis of scattering losses due to sidewall roughness in microphotonic waveguides: high index-contrast," 2005 Conf. on Lasers and Electro-Optics (CLEO), vol. 2, pp. 1333-1335.
Batten et al., "Building Manycore Processor-to-DRAM Networks with Monolithic CMOS Si Photonics," IEEE Micro, p. 8-21 (Jul. 2009).
Becker et al., "Optical Properties of Semiconductors. III. Infra-red Transmission of Silicon," 76 Physical Rev. A, pp. 1531-1532 (1949).
Bethe, "Theory of Diffraction by Small Holes," 66 Phys. Rev. 7-8, pp. 163-182 (Oct. 1944).
Bogaerts et al., "Low-loss, low-cross-talk crossings for silicon-on-insulator nanophotonic waveguides," 32 Optics Letters 19, pp. 2801-2803 (2007).
Bozhevolnyi et al., "Channel Plasmon Subwavelength Waveguide Components Including Interferometers and Ring Resonators," Nature 440 (2006) pp. 508-511.
Bustillo et al., "Surface Micromachining for Microelectromechanical Systems," Proc. of the IEEE 86 (1998) pp. 1552-1574.
Campbell et al., "GaAs Electro-Optic Directional-coupler switch," 27 Applied Physics Lett. 4, pp. 202-205 (Aug. 1975).
Chan et al., "Single-mode and Polarization-independent Silicon-on-insulator waveguides with Small Cross Section," 23 J. Lightwave Tech. 6 (Jun. 2005) pp. 2103-2111.
Chen et al., "Low-loss multimode-interference-based crossings for Silicon Wire Waveguides," 18 IEEE Photonics Letters 21, pp. 2260-2262 (2006).
Chremmos et al., "Properties of Regular Polygons of Coupled Microring Resonators," 46 Applied Optics Optical Society of America 31, pp. 7730-7738 (Nov. 1, 2007).
Chuang, S.L., Physics of Optoelectronic Devices, (Wiley, NY, 1995).
Daldosso et al., "Comparison Among Various Si3N4 Waveguide Geometries Grown within a CMOS Fabrication Pilot Line," 22 J. Lightwave Tech. 7 (Jul. 2004) pp. 1734-1740.
Daldosso et al., "Fabrication and Optical Characterization of thin two-dimensional Si3N4 Waveguides," Mat. Sci. In Semicond. Proc. 7, (2004) pp. 453-458.
Darmawan et al., "Nested Ring Mach-Zender Interferometer," 15 Optics Express Opt. Soc. America 2, pp. 437-448 (Jan. 2001).
Doerr et al., "Wavelength Add-Drop Node Using Silica Waveguide Integration," 22 J. Lightwave Tech. 12, pp. 2755-2762 (Dec. 2004).
Domash et al., "Tunable and Switchable Multiple-Cavity Thin Film Filters," 22 J. Lightwave Tech. 1, pp. 126-135 (Jan. 2004).
Dumon et al., "Low-loss photonic wires and compact ring resonators in silicon-on-insulator," 5450 Proc. SPIE 1, pp. 360-368 (Jan. 2004).
Eichenfield et al., "Actuation of Micro-optomechanical Systems via Cavity-enhanced Optical Dipole Forces," 1 Nature Photonics 7, pp. 416-422 (2007).
Espinola et al., "Fast and Low-Power Thermooptic Switch on Thin Silicon-on-Insulator," 15 IEEE Photon. Tech. Lett. 10, pp. 1366-1368 (2003).
Examination Report in European Patent Application No. 04786154.7, mailed Jul. 16, 2008.
Fan et al., "Theoretical Analysis of Channel Drop Tunneling Processes," 59 Phys. Rev. B 2, pp. 15882-15892 (Jun. 15, 1999).
Findakly et al., "On the Crosstalk of Reversed-$\Delta\beta$ Durectional Coupler Switches," 6 J. of Lightwave Tech. 1, pp. 36-40 (Jan. 1988).
Geuzebroek et al., "Thermally Tuneable, Wide FSR Switch based on Micro-ring Resonators," Proc. Symp. IEEE/LEOS Benelux Chapter, pp. 155-158 (2002).
Gheorma et al., IEEE Photon. Tech. Lett. 14, 795 (2002).
Goebuchi et al., "Fast and Stable Wavelength-Selective Switch Using Double-Series Coupled Dielectric Microring Resonator," 18 IEEE Photonics Tech. Lett. 3, pp. 538-540 (Feb. 1, 2006).
Green et al., Optics Express 15, 17106 (2007).
Green et al., Optics Express 15, 17264 (2007).
Gritsenko et al., "Short-range order in non-stoichiometric amorphous silicon oxynitride and silicon-rich nitride," 297 J. Non-Crystalline Solids 1, pp. 96-101 (Jan. 2002).
Gunn, "CMOS Photonics for High-Speed Interconnects," IEEE Micro 26 (2), pp. 58-66 (Mar./Apr. 2006).
Guo et al., "Characterization of Si3N4/SiO2 Planar Lightwave Circuits and Ring Resonators," Proc. of SPIE, vol. 5350 (2004) pp. 13-22.
Guo et al., "High-Q Microring Resonator for Biochemical Sensors," 5728 Proc. SPIE, pp. 83-92 (2005).
Gupta et al., Conf. on Lasers and Electro-Optics (CLEO), p. paper CTuNN5 (2008).
Haus et al., "Broadband Hitless Bypass Switch for Integrated Photonic Circuits," 18 IEEE Photonics Tech. Lett. 10, pp. 1137-1139 (May 15, 2006).
Haus et al., "Elimination of Cross Talk in Optical Directional Couplers," 46 Applied Physics Lett. 1, pp. 1-3 (Jan. 1, 1985).
Haus, H.A., Waves and Fields in Optoelectronics, (Prentice-Hall, Englewood Cliffs, NJ, 1984).
Holzwarth et al., "High Speed analog-to-digital conversion with silicon photonics," in Proc. SPIE 7220, 72200B (2009).
In et al., "Origami Fabrication of Nanostructured, Three-dimensional Devices: Electrochemical Capacitors with Carbon Electrodes," Appl. Phys. Lett. 88 (2006) 83104.
International Preliminary Report on Patentability and Written Opinion for PCT/US06/028848, mailed Feb. 7, 2008.
International Preliminary Report on Patentability for PCT/US2007/026513 dated Jul. 9, 2009.
International Preliminary Report on Patentability in International Patent Application No. PCT/US2008/003957, dated Sep. 29, 2009 (11 pages).
International Search Report & Written Opinion for International Patent Application No. PCT/US2007/018207, mailed Jul. 29, 2008 (13 pages).
International Search Report & Written Opinion for PCT/US2005/043762, mailed Jun. 19, 2008, 8 pages.
International Search Report & Written Opinion for PCT/US2007/015740, dated Feb. 18, 2008 (10 pages).
International Search Report & Written Opinion for PCT/US2007/026513, mailed Jun. 19, 2008.
International Search Report & Written Opinion for PCT/US2008/00330, mailed Oct. 14, 2008.
International Search Report & Written Opinion for PCT/US2008/080749 dated May 25, 2009 (19 pages).
International Search Report & Written Opinion for PCT/US2008/082054, dated Mar. 18, 2009.
International Search Report & Written Opinion for PCT/US2009/041668, mailed Sep. 11, 2009 (14 pages).
International Search Report & Written Opinion for PCT/US2009/066537, mailed Apr. 16, 2010 (17 pages).
International Search Report for PCT/US06/28848, mailed Feb. 16, 2007.
Jackson, J.D., Classical Electrodynamics (Wiley, NY, 1999).
Johnson et al., "Perturbation Theory for Maxwell's Equations with Shifting Boundaries," Phys. Rev. E, 65, 066611 (2002).
Kelly et al., "Monolithic Suspended Optical Waveguides for InP MEMS," 16 IEEE Photonics Tech. Letters 5, pp. 1298-1300 (2004).
Khan et al., "Mode-Coupling Analysis of Multipole Symmetric Resonant Add/Drop Filters," 35 IEEE J. of Quantum Elec. 10, pp. 1451-1460 (Oct. 1999).

Khurgin et al., "Expanding the Bandwidth of Slow-Light Photonic Devices Based on Coupled Resonators," 30 Optics Lett. 5, pp. 513-515 (Mar. 1, 2005).

Kippenberg et al., "Analysis of Radiation-pressure Induced Mechanical Oscillation of an Optical Microcavity," Phys. Rev. Lett. 95 (2005) 033901.

Kogelnik et al., "Switched Directional Couplers with Alternating $\Delta\beta$," QE-12 IEEE J. Quantum Elec. 7, pp. 396-401 (1976).

Korotky, "Three-Space Representation of Phase-Mismatch Switching in Coupled Two-State Optical System," QE-22 IEEE J. Quantum Elec. 6, pp. 952-958 (1986).

Lee et al., "MEMS-Actuated Microdisk Resonators with Variable Power Coupling Ratios," 17 IEEE Photonics Tech. Lett. 5, pp. 1034-1036 (May 2005).

Lee et al., "Tunable Coupling Regimes of Silicon Microdisk Resonators using MEMS Actuators," 14 Optics Express 11, pp. 4703-4712 (May 29, 2006).

Li et al., Optics Express 16, 13342 (2008).

Little et al., "Filter Synthesis for Periodically Coupled Microring Resonators," 25 Optics Lett. 5, pp. 344-346 (Mar. 1, 2000).

Little et al., "Microring Resonator Channel Dropping Filters," J. Lightwave Tech. 15, pp. 998-1005 (1997).

Little et al., "Very High-order Microring Resonator Filters for WDM Applications," 16 IEEE Photonics Tech. Lett. 10 (Oct. 2004) pp. 2263-2265.

Little et al., "Wavelength Switching and Routing using Absorption and Resonance," 10 IEEE Photonics Tech. Lett. 6, pp. 816-818 (Jun. 1998).

Liu et al., "Low-loss waveguide crossing using a multimode interference structure," 241 Optics Communications 1-3, pp. 99-104 (2004).

Maboudian et al., "Critical Review: Adhesion in Surface Micromechanical Structures," J. Vac. Sci. Tech. B, 15 (1997).

Madsen et al., "A Multi-Port Add/Drop Router using UV-induced Gratings in Planar Waveguides," Lucent Technologies, pp. 104-106 (Feb. 1999).

Madsen et al., "Hitless Reconfigurable Add/Drop Multiplexers using Bragg Gratings in Planar Waveguides," OSA TOPS, v. 29, WDM Components, pp. 54-60.

Madsen et al., Optical Filter Design and Analysis: A Signal Processing Approach, (Wiley, NY, 1999).

Madsen, "Efficient Architectures for Exactly Realizing Optical Filters with Optimum Bandpass Designs," 10 IEEE Photonics Tech. Lett. 8, pp. 1136-1138 (Aug. 1998).

Manolatou et al., "Coupling of Modes Analysis of Resonant Channel Add-Drop Filters," 35 IEEE J. of Quantum Elec. 9, pp. 1322-1331 (Sep. 1999).

Manolatou et al., "High-Density Integrated Optics," 17 J. Lightwave Tech. 9, pp. 1682-1692 (Sep. 1999).

McDonald, "Electric and Magnetic Coupling through Small Apertures in Shield Walls of any Thickness," MTT-20 IEEE Trans. on Microwave Theory & Techniques 10, pp. 689-695 (Oct. 1972).

Melchiorri et al., "Propogation Losses of Silicon Nitride Waveguides in the Near Infrared Range," Appl. Phys. Lett. 86, 121111 (2005).

Melloni et al., "Synthesis of Direct-Coupled-Resonators Bandpass Filters for WDM Systems Lightwave Technology," 20 J. Lightwave Tech. 2, pp. 296-303 (2002).

Melloni et al., Integr. Photon. Research and Applications/Nanophotonics (IPNRA), p. paper IMC1 (2006).

Mizrahi et al., "Mirror Manipulation by Attractive and Repulsive Forces of Guided Waves," Opt. Express 13 (2005) pp. 9804-9811.

Mizrahi et al., "Two Slab Optical Spring," Optics Lett. 32 (2007) pp. 692-694.

Nichol et al., "Thin Membrane Self-alignment using Nanomagnets for Three-dimensional Nanomanufacturing," J. Vac. Sci. Tech B (Microelectronics & Nanometer Structures) 24 (2006) pp. 3128-3132.

Nichols et al., "A Preliminary Communication on the Pressure of Heat and Light Radiation," Phys. Rev. 13 (1901) pp. 307-320.

Nielson et al., "Integrated Wavelength-selective Optical MEMS Switching using Ring Resonator Filters," IEEE Photonics Tech. Lett. 17 (2005) pp. 1190-1192.

Nielson, G.N., "Micro-opto-mechanical Switching and Tuning for Integrated Optical Systems," Ph.D. Thesis, Massachusetts Institute of Technology (2004).

Notomi et al., "Optomechanical Wavelength and Energy Conversion in High-Q Double-layer Cavities of Photonic Crystal Slabs," Phys. Rev. Lett. 97 (2006) 023903.

Oda et al., "A Wide-FSR Waveguide Double-Ring Resonator for Optical FDM Transmission Systems," 9 J. Lightwave Tech. 6, pp. 728-736 (1991).

Okamoto, K., Fundamentals of Optical Waveguides, (Elsevier Academic Press, MA, 2006).

Papuchon et al., "Electrically switched Optical Directional Coupler: Cobra," 27 Applied Physics Lett. 5, pp. 289-291 (Sep. 1, 1975).

Partial International Search Report for International Application No. PCT/US2007/018207, mailed Jun. 2, 2008 (5 pages).

Partial International Search Report for International Application No. PCT/US2008/00330, mailed Jul. 30, 2008 (5 pages).

Partial International Search Report for International Application No. PCT/US2008/003957, mailed Jun. 16, 2008 (8 pages).

Partial International Search Report for International Application No. PCT/US2008/080749, mailed Mar. 24, 2009.

Philipp et al., "Amorphous Silicon Rich Silicon Nitride Optical Waveguides for High Density Integrated Optics," 40 IEEE Electronics Letters 7, pp. 419-420. (Apr. 2004).

Poon et al., "Wavelength-selective reflector based on a circular array of coupled microring resonators," 16 IEEE Photonics Technology Letters 5, pp. 1331-1333 (May 2004).

Popovic et al., "General Approach to Hitless Switching and FSR Extension Resonators in Integrated Photonic Circuits," 2006 IEEE Optical Fiber Communication Conference and National Fiber Optic Engineers Conference (3 pages).

Popovic et al., "High-index-contrast, Wide-FSR Microring-Resonator Filter Design and Realization with Frequency-shift Compensation," in Optical Fiber Communication Conf., Tech. Dig. (2005) Paper OFK1, vol. 5, pp. 213-215.

Popovic et al., "Multistage High-Order Microring-Resonator add-drop Filters," 31 Optics Lett. 17 (Sep. 2006) pp. 2571-2573.

Popovic et al., Optics Express 14, 1208 (2006).

Popovic, "Air Trenches for Dense Silica Integrated Optics," MS Thesis, Massachusetts Institute of Technology, Dept. of Electrical Engineering & Computer Science, Feb. 2002, p. 53.

Popovic, "Optimally efficient resonance-tuned optical modulators," in CLEO 2009, paper CTuV6 (2 pages) (May 2009).

Popovic, Resonant optical modulators beyond conventional energy-efficiency and modulation frequency limitations.

Popovic, "Theory and Design of High-Index-Contrast Microphotonic Circuits," Ph.D. Thesis, Massachusetts Institute of Technology, Dept. of Electrical Engineering & Computer Science, Feb. 2008.

Popovic, M., "Complex-frequency Leaky Mode Computations using PML Boundary Layers for Dielectric Resonant Structures," Proc. of Integ. Photonics Res. (Jun. 2003).

Povinelli et al., "Enhancement mechanisms for optical forces in integrated optics," 6326 Proc. of SPIE Optical Trapping & Optical Manip. III 15, (2006).

Povinelli et al., "Evanescent-wave Bonding Between Optical Waveguides," Optics Lett. 30 (2005) pp. 3042-3044.

Povinelli et al., "High-Q Enhancement of Attractive and Repulsive Optical Forces between Coupled Whispering-gallery-mode Resonators," Opt. Express 13 (2005) pp. 8286-8295.

Qi et al., "A Three-dimensional Optical Photonic Crystal with Designed Point Defects," Nature 429 (2004) pp. 538-542.

Rabiei et al., "Polymer Micro-Ring Filters and Modulators," J. Lightwave Tech. 20, 1968 (2002).

Rakich et al., "Achieving Centimeter-scale supercollimation in a Large-area Two-dimensional Photonic Crystal," Nature Materials 5 (2006) pp. 93-96.

Rakich et al., "Cavity-Trapping via Optical-forces in Integrated Photonics," Massachusetts Institute of Technology.

Rakich et al., "Trapping, corraling and spectral bonding of optical resonances through optically induced potentials," 1 Nature Photonics 11, pp. 658-665 (2007).

Rakich et al., "Ultrawide Tuning of Photonic Microcavities via Evanescent Field Perturbation," Optics Lett. 31 (2006) pp. 1241-1243.

Rezzonico et al., Optics Express 16, 613 (2008).

Rhodes, "A Low-Pass Filter Prototype Network for Microwave Linear Phase Filters," MTT-18 IEEE Trans. Microwave Theory Tech. 6, pp. 290-301 (Jun. 1970).

Sacher et al., Optics Express 16, 15741 (2008).

Sarid, D., Scanning Force Microscopy with Applications to Electric, Magnetic, and Atomi Forces, (Oxford University Press, NY, 1994).

Saynatjoki et al., "High-index-contrast Optical Waveguides on Silicon," ICPS-27, 2 pages (2005).

Scotti et al., "A Hitless Reconfigureable Add-Drop Multiplexer of WDM Networks Utilizing Planar Waveguides, Thermo-Optic Switches and UV-Induced Gratings," OFC Tech. Dig., pp. 142-143 (Feb. 1998).

Song et al., "Ultra-high-Q Photonic Double-heterostructure Nanocavity," Nature Materials 4 (2005) pp. 207-210.

Spector et al., "Hybrid multi-mode/single-mode Waveguides for Low Loss," Massachusetts Institute of Technology, OAA/IPR, 3 pages (2004).

Srinivasan et al., "Alkyltrichlorosilane-based Self-assembled Monolayer Films for Stiction Reduction in Silicon Micromachines," J. of Microelectromechanical Sys. 7 (1998) pp. 252-260.

Sugimoto et al., "Waveguide polarization-independent Optical Circulator," 11 IEEE Photon. Tech. Lett. 3, pp. 355-357 (Mar. 1999).

Suh et al., "Temporal Coupled-Mode Theory and the Presence of Non-Orthogonal Modes in Lossless Multimode Cavities," 40 IEEE J. of Quantum Elec. 10, pp. 1511-1518 (Oct. 2004).

Takahashi et al., "Tunable Chromatic Dispersion Compensator Utilizing Silica Waveguide Ring Resonator having Mach-Zehnder Interferometric Variable Coupler Eliminating Crossing Point of Waveguides," 15th Annual Meeting of IEEE Lasers and Electro-Optics Society, v.2, pp. 665-666 (Nov. 10-14, 2002).

Tang et al., Highly efficient optical phase modulator in SOI waveguides, 31 Electronics Letters 6, pp. 451-452 (1995).

Tormen, "Passive Optical Integrated Components for Telecommunication," Thesis, Universite De Nice-Sophia Antipolis (2003) 196 pages.

Van Spengen et al., "A Physical Model to Predict Stiction in MEMS," J. of Micromechanics & Microengineering 12 (2002) pp. 702-713.

Watts et al., "Maximally Confined Silicon Microphotonic Modulators and Switches," IEEE Proc. of the LEOS Ann. Meet., p paper WF1, pp. 457-458 (2008).

Weber et al., "Crosstalk and Switching Characteristics in Directional Couplers," 24 IEEE J. of Quantum Elect. 3, pp. 537-548 (Mar. 1988).

Wei et al., "Compound Ring Resonator with Double Couplers," 186 Optics Communications 4-6, pp. 283-290 (Dec. 15, 2000).

Williamson, "Sensitivity-bandwidth product for electro-optic modulators," Optics Letters 26, 1362 (2001).

Xu et al., "Experimental Realization of an on-Chip All-Optical Analogue to Electromagnetically Induced Transparency," Phys. Rev. Lett. 96, pp. 1-4 (2006).

Xu et al., "Micrometre-scale silicon electro-optic modulator," Nature, vol. 435, pp. 325-327 (2005).

Yanagase et al., "Box-Like Filter Response and Expansion of FSR by a Vertically Triple Coupled Microring Resonator Filter," 20 J. Lightwave Tech. 8, pp. 1525-1529 (2002).

Yanik et al., "Stopping Light All Optically," 92 Phy. Rev. Lett. 8, pp. 1-4 (Feb. 27, 2004).

Yariv et al., "Coupled-Resonator Optical Waveguide: a Proposal and Analysis," 24 Optics Lett. 11, pp. 711-713 (Jun. 1, 1999).

Devaux et al. "High-Speed Tandem of MQW Modulators for Coded Pulse Generation With 14-DB Fiber-to-Fiber Gain," 8 IEEE Photonics Tech. Lett. 2, Feb. 1996, pp. 218-220.

Holzwarth et al., "Localized Substrate Removal Technique Enabling Strong-Confinement Microphotonics in Bulk Si CMOS Processes," CLEO/QELS, May 4-9, 2008, 2 pages.

Preston et al. "High-Speed All-Optical Modulation Using Polycrystalline Silicon Microring Resonators," Applied Physics Letters, vol. 92, No. 15, Apr. 15, 2008, pp. 151104-1-3.

International Search Report for PCT Application No. PCT/US2010/036630, mailed Sep. 15, 2010, 4 pages.

Written Opinion for PCT Application No. PCT/US2010/036630, mailed Sep. 15, 2010, 3 pages.

Watts et al. "Micro-ring resonator filter with doubled free-spectral-range by two-point coupling" Proc. Conference on Lasers and Electro-Optics (CLEO), Baltimore, MD, vol. 1, CMP3, pp. 273-275, May 2005.

* cited by examiner

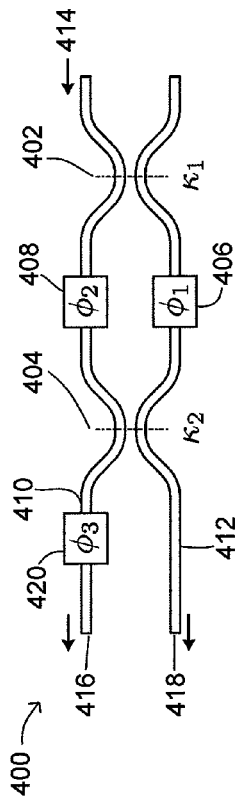
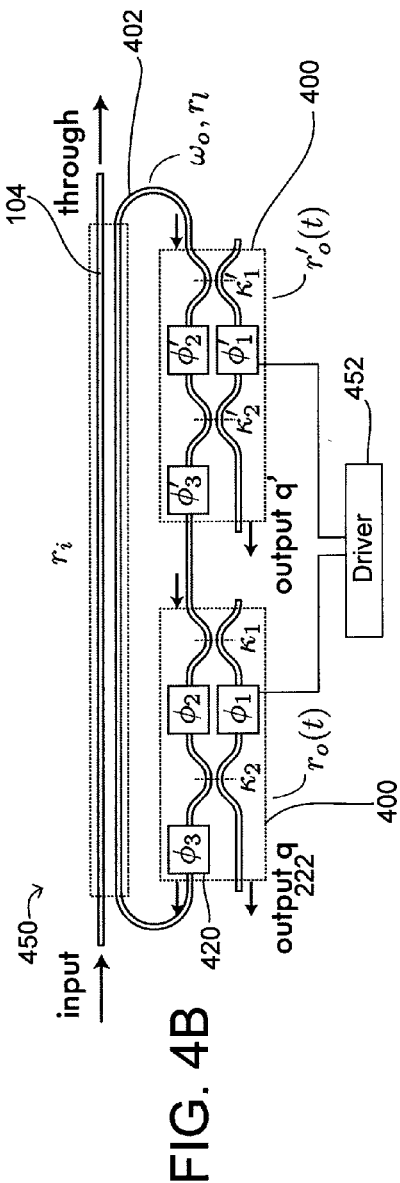
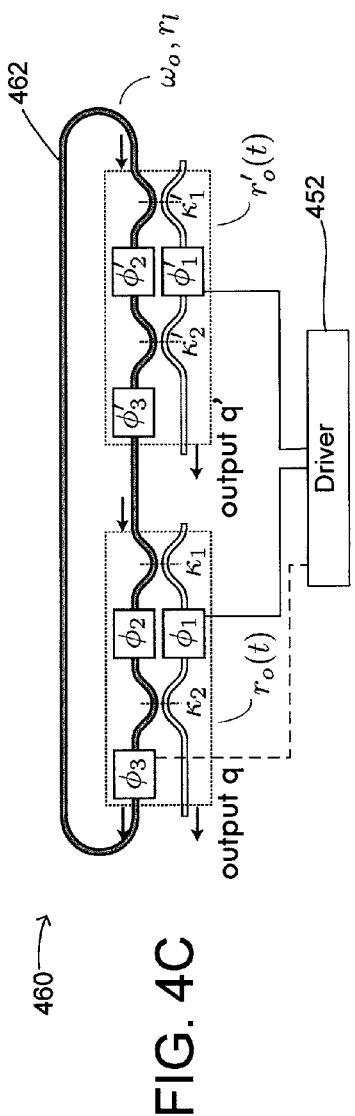
FIG. 4A
FIG. 4B
FIG. 4C

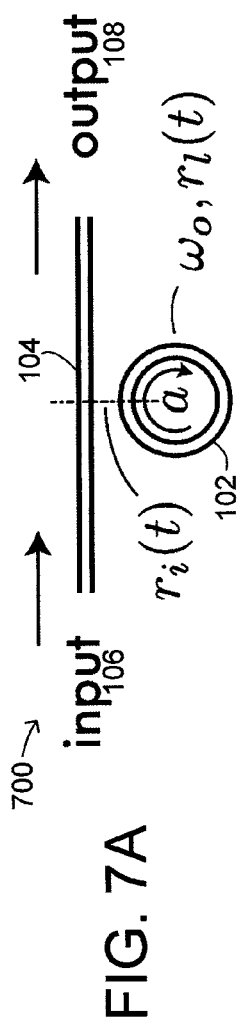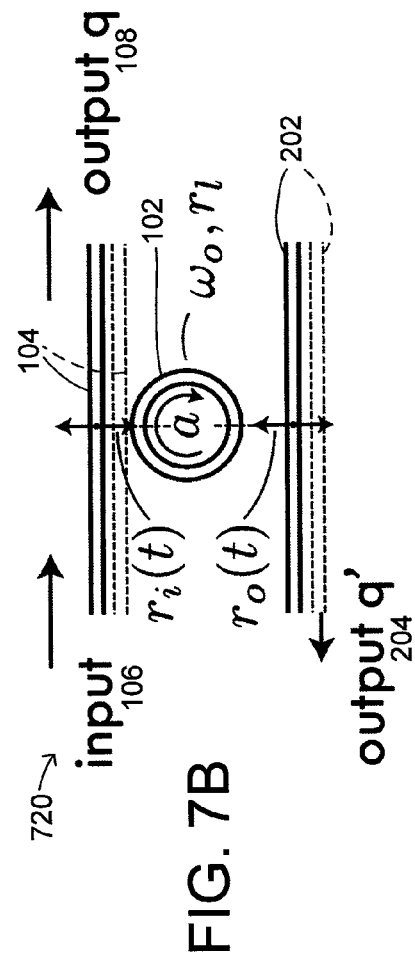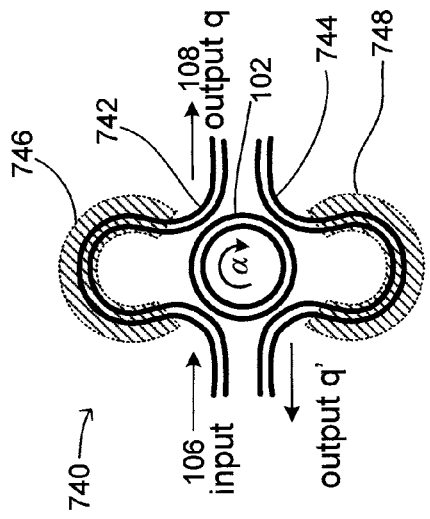

CAVITY DYNAMICS COMPENSATION IN RESONANT OPTICAL MODULATORS

CROSS-REFERENCE TO RELATED APPLICATION

This application claims priority to and the benefit of U.S. Provisional Patent Application No. 61/182,632, filed May 29, 2009, which is hereby incorporated herein by reference in its entirety.

STATEMENT REGARDING FEDERALLY SPONSORED RESEARCH OR DEVELOPMENT

This invention was made with government support under Grant Number W911NF-08-1-0362 awarded by the U.S. Army Research Office. The U.S. Government has certain rights in the invention.

TECHNICAL FIELD

The present invention relates, generally, to resonant optical modulators. More specifically, various embodiments relate to structures, devices, and methods for suppressing cavity dynamics in optical modulators to overcome the bandwidth-sensitivity limit.

BACKGROUND

Integrated optical modulators have important applications in telecommunications and data-communications, as well as sensing. Optical intensity modulators generally facilitate imparting information onto laser light by modulating the intensity of an incident narrow-line (usually continuous-wave) laser signal. Relevant performance metrics for such modulators include modulation speed, sensitivity to the modulation drive signal and energy efficiency, extinction ratio (i.e., the ratio of the minimum to the maximum light intensity during a modulation cycle), and footprint. Resonant-cavity-based optical modulators (e.g., microcavity or microring modulators) typically enhance sensitivity by allowing light to circulate the cavity, and pass through a region of modulated index, many times on resonance. Further, their typically small footprint reduces drive capacitance. Both effects contribute to greater energy efficiency. However, conventional resonant modulators are subject to a well-known trade-off between sensitivity and modulation speed.

FIG. 1 illustrates an exemplary conventional resonant modulator 100, including a microring resonator 102 optically coupled to an optical waveguide 104. In operation, light enters the modulator at an input port 106 of the waveguide, and modulated light exits the modulator at a through port 108 of the waveguide. The modulator is characterized by a resonance frequency $\omega_0$ and a cavity loss rate $r_l$ of the microring, and an input coupling rate $r_i$. Each of these quantities may be variable in response to a modulation drive signal and thus provide a modulation mechanism. When the resonance frequency $\omega_0$ or loss $r_l$ rate is modulated, the maximum modulation speed equals the optical resonance bandwidth (i.e., line width of the resonance), rendering a high optical resonance bandwidth desirable. On the other hand, sensitivity increases are achieved with bandwidth decreases because a narrower bandwidth requires a smaller resonance frequency shift to modulate the transmitted signal from the resonant peak to a high extinction point, and thus enables lower-energy switching between modulation states. The resulting trade-off between sensitivity and speed is therefore often summarized as a bandwidth-sensitivity product.

The relation between bandwidth and modulation speed results from the cavity dynamics during modulation. For example, when the resonance frequency $\omega_0$ is modulated, such modulation alternates the system between a state where the signal is on-resonance and a state where the signal is off-resonance. In a critically coupled resonator (i.e., for $r_i=r_l$), the transmission to the through port 108 is zero (corresponding, e.g., to a zero bit) on-resonance, but high (corresponding, e.g., to a one bit) off-resonance. On-resonance, the cavity (e.g., the interior of the microring) is loaded according to the finesse, inversely proportional to the line width, while off-resonance, the cavity is empty. Therefore, an instantaneous change in the resonance frequency causes a transition of the system from an old to a new steady-state photon population (optical energy) over a time interval of the cavity lifetime of a cavity photon. As a result, the through-port signal changes with a time constant of the cavity lifetime, which is the inverse of the cavity bandwidth.

When the resonance frequency is kept constant and the loss rate $r_l$ is instead modulated between $r_l=0$ and $r_l=r_i$ the system alternates between an all-pass state (one bit) and a critically coupled state (zero bit). The steady-state photon population of (optical energy in) the all-pass state is half that of the critically coupled state. Therefore, modulation again results in a transient state with a time-constant of the cavity lifetime. Practically, this limitation means that if the optical bandwidth is narrowed below the modulation bandwidth (e.g., the bandwidth of an electrical drive signal) to enhance modulation efficiency, the optical response to the modulation is slowed down relative to the drive signal. Modulation of the resonance frequency $\omega_0$ or loss rate $r_l$ thus results in a low-pass modulation response.

The bandwidth-sensitivity limit can at least partially be overcome by modulating the input coupling rate $r_i$, rather the resonance frequency or loss rate. When the input coupling is modulated, the change in the through-port signal has two contributions: first, the input coupling determines directly and instantaneously the fraction of the cavity mode that is coupled out to the waveguide 104, and, second, the input coupling affects the photon lifetime, which, in turn, determines the cavity transients. In this case, the modulation frequency can exceed the optical bandwidth because a loaded cavity provides a source of light that can be instantaneously coupled out, with fast modulation unattenuated. However, low-frequency modulation is attenuated as a consequence of cavity dynamics. While the cavity population remains approximately in steady state during high-frequency modulation, low-frequency modulation results in cavity loading or depletion, causing variations in the signal strength of the all-pass signal. Thus, using input coupling rate modulation induces distortions of the modulated output signal at lower modulation frequencies.

Accordingly, there is a need for improved optical modulators that simultaneously achieve high modulation speed, high sensitivity, and high fidelity of the output signal.

SUMMARY

Embodiments of the present invention overcome certain limitations of conventional resonant optical modulators by decoupling the modulation response from the optical bandwidth of the resonator. In various embodiments, two (or more) modulation parameters are simultaneously varied such that cavity-mode dynamics are suppressed during modulation, i.e., such that the photon population in the resonator is constant and equal to the steady-state population corresponding to each modulation state. Thus, while modulation of one parameter serves to achieve the desired modulation of the optical signal, simultaneous modulation of the other parameter(s) serves to compensate for any cavity dynamics that would be incurred if the first parameter alone were modulated. Suitable modulation parameters include, for example, input and output coupling rates as well as the cavity loss rate.

In some embodiments, optical modulators in accordance with the invention include an optical resonator (e.g., a microring or other travelling-wave resonator, or a standing-wave resonator), and two output ports coupled thereto with variable coupling rates. The coupling rates between the resonator and each of the two output ports may be modulated out of step, in "push-pull operation," such that the sum of the coupling rates is constant. The total output coupling is then fixed, resulting in a constant photon population (and constant photon lifetime) in the cavity, and complementary modulated output signals in the two ports. Alternatively, one output coupling rate and the loss rate of the cavity may be modulated simultaneously such that their sum is constant. The optical resonator may be charged passively, via light coupling from an input waveguide into the resonator, or actively, if the resonator constitutes a lasing cavity. In some embodiments of modulators including an input port and at least one output port coupled to the resonator, a constant photon population is achieved by simultaneous modulation of the input coupling rate and an output coupling or loss rate. In this case, the resonator bandwidth changes dynamically with modulation, but the photon population is still constant.

The term "simultaneous," as used herein, refers to an overlap in the time intervals during which the parameters are varied. For example, during "simultaneous modulation," the modulation time intervals of the two (or more) variable parameters need not coincide perfectly, nor does there need to be a substantial overlap in time. However, the desired effect of mutual cancellation of cavity-mode dynamics is generally limited to the periods in which both parameters are modulated. Further, while, ideally, the modulation parameters are varied synchronously and complementarily (e.g., in the case of two sinusoidal output coupling rates, with a phase shift of $\pi$ at all times) to cancel out any effect that they would individually have on the cavity photon population, a partial cancellation, which would result, e.g., from imperfect synchronization between the modulation parameters, is also within the scope of the invention. In general, the advantages of the dynamics-compensating devices and methods contemplated herein are practically achieved as long as the photon population is substantially constant (e.g., varies by less than 50% (2× between maximum and minimum), preferably less than 20%, more preferably less than 5%, and even more preferably less than 1%) during modulation. By comparison, in conventional designs, the photon population can vary by several orders of magnitude (from nearly zero to a finite "full" population).

In one aspect, various embodiments of the invention provide a resonant optical modulator including an optical resonator (e.g., a ring resonator or a standing-wave cavity resonator), first and second ports that are optically coupled to the optical resonator with time-variable coupling rates, and a driver for simultaneously modulating the time-variable coupling rates such that a photon population in the optical resonator (and, in certain embodiments, also a photon lifetime) is substantially constant. The resonator may be or include a lasing cavity. The modulator may further include a micro- or nanomechanical actuator for modulating the first and/or second coupling rates by modulating a distance between the respective port and the optical resonator.

In some embodiments, the first port and second ports are input and output ports, respectively. In other embodiments, the first and second ports are both output ports. The output ports may be coupled to the resonator by two Mach-Zehnder interferometers, or by a three-waveguide interferometer. The sum of the two coupling rates may be substantially constant (e.g., vary by less than 50%, preferably less than 20%, more preferably less than 5%, and even more preferably less than 1%). In the case where the first and second ports are both output ports, the modulator may further include an input port, coupled to the resonator, for receiving an optical input signal, and the coupling rate between the input port and the resonator may be substantially constant (e.g., varies by less than 20%, preferably less than 10%, more preferably less than 5%, and even more preferably less than 1%). In certain embodiments, the modulator comprises an additional port coupled to the resonator with a variable coupling rate, and/or the resonator has a variable loss rate. The driver may then simultaneously modulate three or more of the variable rates so as to keep the photon population of the resonator substantially constant (e.g., let it vary by less than 50%, preferably less than 20%, more preferably less than 5%, and even more preferably less than 1%).

In another aspect, a method for modulating an optical signal in a resonant optical modulator that includes an optical resonator coupled to first and second ports with first and second coupling rates (e.g., as described above) is provided. The method includes modulating the first coupling rate so as to modulate an output signal coupled out to the first port, and simultaneously modulating the second coupling rate such that a photon population in the optical resonator remains substantially constant. The first port may be an output port, while the second port may be an input or an output port. Modulating the first coupling rate may include modulating a phase difference in a Mach-Zehnder interferometer coupling the optical resonator to the first port or, alternatively, modulating a distance between the first port and the optical resonator (e.g., using a micro- or nanomechanical actuator).

In a further aspect, embodiments of the invention provide a resonant optical modulator that includes an optical resonator (which may, e.g., be a ring resonator or a standing-wave cavity resonator, and may be or include a lasing cavity) having a time-variable loss rate, a port optically coupled to the optical resonator with a time-variable coupling rate, and a driver for simultaneously modulating the time-variable loss rate and the time-variable coupling rate such that a photon population in the optical resonator is substantially constant. The modulator may further include a Mach-Zehnder interferometer that couples the optical resonator to the port. The modulator may also include a micro- or nanomechanical actuator for modulating the coupling rate by modulating a distance between the port and the optical resonator.

The port may be an input port or an output port. If the port with variable coupling rate is an output port, the sum of that coupling rate and the loss rate may be substantially constant (e.g., vary by less than 50%, preferably less than 20%, more preferably less than 5%, and even more preferably less than 1%). Further, the modulator may have a second port optically coupled to the optical resonator with a second coupling rate (which may be substantially constant, e.g., vary by less than 20%, preferably less than 10%, more preferably less than 5%, and even more preferably less than 1%). The second port may be an input port for receiving an optical input signal.

In yet another aspect, a method of modulating an optical signal in a resonant optical modulator having an optical resonator with a time-variable loss rate, coupled to a port with a time-variable coupling rate, is provided. The method includes modulating the coupling rate so as to modulate an output signal, and simultaneously modulating the loss rate such that a photon population in the optical resonator remains substantially constant.

In yet another aspect, a method of modulating an optical signal in a resonant optical modulator that includes an optical resonator coupled to a plurality of ports is provided. At least two of a loss rate of the optical resonator and coupling rates between the resonator and the ports are time-variable. The method includes simultaneously modulating at least two of the rates so as to modulate an output signal while keeping a photon population (optical energy) in the optical resonator substantially constant.

Resonant optical modulators in accordance with various embodiments facilitate eliminating the dependence of the modulation response on the optical resonator bandwidth, thus providing a flat, distortion-free modulation response independent of the resonant cavity enhancement. As a result, arbitrarily-high-Q cavities may, in principle, be used in the modulators to increase sensitivity and energy efficiency, in certain embodiments by orders of magnitude, without adverse effects on the modulation response. Integrated resonant optical modulators may be used in a variety of applications, including telecommunications and datacommunications, on-chip and inter-chip photonic interconnects for multicore microprocessors and dynamic random access memory (DRAM), analog signal processing including photonic analog-to-digital conversion, and sensing.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the following description, various embodiments and implementations are described with reference to the following drawings, in which:

FIG. 4A is a schematic drawing of a Mach-Zehnder interferometer;

FIG. 4B is a schematic drawing of a resonant optical modulator with two output ports coupled to a ring resonator via Mach-Zehnder interferometers in accordance with one embodiment;

FIG. 4C is a schematic drawing of a resonant optical modulator with two output ports coupled to a lasing-cavity ring resonator via Mach-Zehnder interferometers in accordance with one embodiment;

FIG. 7A is a schematic drawing of a resonant optical modulator utilizing simultaneous modulation of the input coupling and loss rates in accordance with one embodiment;

FIG. 7B is a schematic drawing of a resonant optical modulator utilizing simultaneous modulation of the input and output coupling rates in accordance with one embodiment;

FIG. 7C is a schematic drawing of a resonant optical modulator with an input and an output port coupled to a ring resonator via Mach-Zehnder interferometers of unequal arm-length in accordance with one embodiment;

Throughout the drawings, like reference characters generally refer to the same parts. Further, the drawings are not necessarily to scale, emphasis instead generally being placed upon illustrating the principles of the invention.

DESCRIPTION

Figure 1:
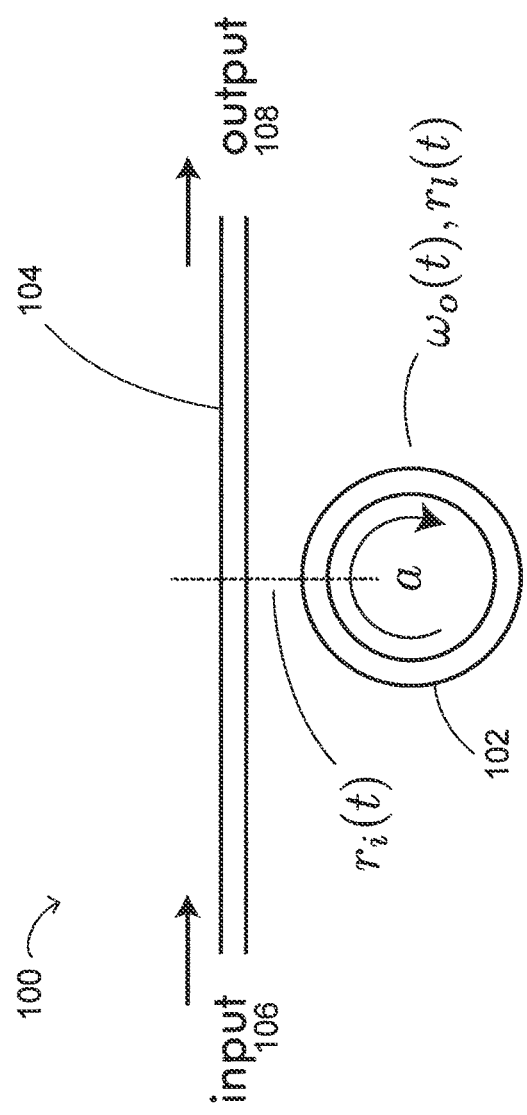
FIG. 1 is a schematic drawing of a conventional resonant optical modulator.

In general, embodiments of the invention relate to resonant optical-intensity modulators. An optical modulator typically receives monochromatic light (usually narrow-bandwidth laser light) at an input port, and provides intensity-modulated light at an output port. The intensity modulation is typically effected by an electrical drive signal that changes a physical property of the modulator, such as a refractive index or a distance between modulator components, via one of a variety of electro-optic, electromechanical, thermo-optic, or optomechanical (light-force-actuated) mechanisms. In a resonant optical modulator, the laser light is usually transmitted by a resonator structure from an input waveguide to an output waveguide (or to a through port of the input waveguide), and modulation is achieved by varying the resonant properties or the coupling rates. Alternatively, the resonator may include an active laser medium that internally generates light, and then couples light with a variable coupling rate to one or more output ports.

Optical modulators in accordance with embodiments of the present invention may be fabricated from various semiconductor and/or insulating materials, using standard lithography and etching techniques. The fabrication of silicon structures typically starts with a silicon-on-insulator (SOI) wafer, whose top silicon layer has a thickness suitable for single-mode strongly confined waveguides. To prepare the wafer for patterning, a resist layer may be spin-coated or otherwise placed on top of the silicon layer. For subsequent patterning by electron beam lithography, sesquisiloxane may be used for the resist. Alternatively, for optical lithography, a photoresist such as polymethyl methacrylate (PMMA) may be used. HBr-chemistry-based reactive-ion etching (RIE) may then be employed to etch the mask pattern into the silicon layer. After the resist has been removed, the patterned silicon structures (e.g., waveguides, resonators, etc.) appear as raised structures on the silica layer underneath. For photonics applications, the silica layer is preferably about 2-3 μm thick, which serves to avoid optical loss by leakage into the silicon substrate.

To facilitate optical modulation, structures with optically variable properties may be created by doping certain regions (e.g., a resonator ring intended to have variable absorptive properties). Regions not to be doped may be protected by one or more additional masks, formed, for example, of silicon nitride, and patterned by lithography and etching. Doping may be achieved by ion implantation through a mask, or by thermal diffusion in gas atmosphere containing the ion(s) of interest. Boron may be used for p-type doping, and arsenic or phosphorus may be used for n-type doping. Typical dopant concentrations are between $10^{16}$ and $10^{20}$ ions per cubic centimeter, depending on the p-i-n junction design. Doped regions facilitate the manipulation of the optical material properties by carrier injection. Alternatively, structures with variable properties may be created by lithographically patterning a layer of metal deposited above the waveguides into a micro-heater—a resistive metal part in proximity to the optical structure, but sufficiently displaced to avoid introducing substantial optical losses. Passing a current through the metallic micro-heater will generate heat and a temperature increase in a localized region, thus creating an index change and concomitant phase shift in the optical waveguides included in the local region. An alternative is to form micro-heaters by using doped silicon structures in the waveguide layer, or another material layer, for conduction. Another way to create structures adapted for modulation includes forming wave-guiding structures of an electro-optic material, and implementing electrodes that allow application of a voltage across the region containing the electro-optic wave-guiding structure.

Similar techniques may be employed to fabricate non-silicon structures, such as structures based on III-V semiconductors like indium phosphide (InP), or on silicon nitride or other amorphous materials. Fabrication may again start with a substrate wafer, on top of which an undercladding layer with a low index of refraction, and a semiconductor layer or high-index dielectric for the waveguide core are disposed in the order listed. The waveguides are then similarly formed by lithography and etching steps. In the cases of non-crystalline core materials, such as silicon nitride, the waveguide core (SiN) layer may be deposited by plasma-enhanced chemical vapor deposition (PE-CVD), a low-pressure chemical vapor deposition (LP-CVD), or a vertical thermal reactor (VTR) process.

In resonant optical modulators, light intensity may be modulated by means of varying the transfer properties of the resonator. For, example, the electrooptic effect may be used to vary the refractive index, and hence the resonance frequency, of the resonator. The resonator passes incoming laser light only when the resonance frequency substantially coincides with the laser frequency (i.e., when the resonance band and the laser line overlap), and blocks the laser light when the resonance frequency is detuned from the laser frequency. The absorption properties, and thus the loss rate of the resonator, may be modulated using electro-absorption based on, for example, the Franz-Keldysh or quantum-confined Stark effect. Carrier injection in silicon structures may be employed to change both the refractive and the absorptive properties (i.e., the complex index) of the resonator structure.

In addition to or instead of changing the resonator itself, the input coupling of the laser light into the resonator, or the output coupling to one or more output ports, may be modulated. Such modulation may be effected with a variable differential phase shift between the two coupled structures (e.g., between an input waveguide and a microring resonator). For that purpose, phase shifters may be included in one or both of the coupled structures. Phase shifters may be implemented using, for example, waveguide sections where the phase shifts are effected through the thermo-optic effect—via the thermo-optic coefficient of the waveguide core and/or cladding material(s)—by providing local heating (which may be accomplished by placing micro-heaters in proximity); waveguide sections comprising a p-i-n junction where phase shifts are created by generating a carrier plasma in the optical guiding region, e.g., via carrier injection or depletion; or waveguide sections comprising an electro-optic material, such as a polymer, and actuated by forming an electric field in the waveguide region by application of a voltage across integrated electrodes. Alternatively, coupling rates may be varied by changing the distance between the coupled structure using micro- or nanomechanical actuators, e.g., based on micro-electromechanical systems (MEMS). Coupling rates may also be changed by bringing an auxiliary structure, such as an additional waveguide, in the proximity of the input or output waveguide or the resonator, thereby effectively changing the dimensions and/or average material properties of the combined structure.

Modulators in accordance with various embodiments of the present invention facilitate the simultaneous, synchronous modulation of at least two parameters such that no transient states are incurred in the cavity-mode dynamics of the resonator cavity and, thus, the photon lifetime has no effect on the modulation dynamics. Transient states are avoided if the steady-state photon population of the resonator cavity is the same in all modulation states, which, in turn, requires a constant energy amplitude enhancement in the resonant cavity. The energy amplitude enhancement $a/s_i$ (i.e., the ratio between the square root $a$ of the energy in the resonator and the square root $s_i$ of the power coupled into the resonator) depends on the resonance frequency $\omega_0$, the input coupling rate $r_i$, and the total cavity decay rate $r_{total}$ according to:

$$\frac{a}{s_i} = \frac{-j\sqrt{2r_i}}{j(\omega - \omega_0) + r_{total}}.$$

Herein, $r_{total}$ is the inverse of the photon lifetime $\tau_{total}$ and is additively composed of the loss rate $r_l$ and the input and output coupling rates $r_i, r_o'$, $r_{total}=1/\tau_{total}=r_i+r_o+r_l$. The output coupling rate may itself comprise two or more components, each associated with a separate output port.

In order to simultaneously modulate two parameters, two coordinated drive signals may be used. In some embodiments, the driver hardware may internally ensure that the two (or more) selected modulation parameters collectively suppress cavity-mode dynamics. For example, an electrical drive circuit may include a digital signal processor (or, alternatively, an analog circuit component) that provides complementary modulation waveforms. In alternative embodiments, computation of the modulation signals may be software-implemented. The driver may, for example, include a drive circuit and a general-purpose computer on which software for computing the modulation waveforms is installed. The computer may send the waveforms to the drive circuit, which then generates corresponding electrical drive signals that directly determine the time-variable properties of the optical modulator components. Advantageously, software-enhanced drivers provide a straightforward means to compute modulation signals for any combination of modulation parameters, including, for example, the simultaneous modulation of more than two parameters (e.g., an input and two output coupling rates).

In certain embodiments, it may be feasible to use a single (electrical) drive signal, and design the optical structures such that the selected modulation parameters nonetheless complement one another. For example, a resonator may be coupled to two output ports via two Mach-Zehnder interferometers that differ structurally only in a phase shift implemented in one interferometer arm of one, but not the other, interferometer. This may result in one interferometer coupling power out, and the other not coupling power out. When the other interferometer arms are modulated in parallel by a single modulation mechanism to produce simultaneously an additional phase of π in both, this now results in opposite coupling behavior as desired.

In preferred embodiments of the present invention, the resonance frequency $\omega_0$ is kept constant, and at least two of an input coupling rate, a resonator loss rate, and one or more output coupling rates are simultaneously modulated. (If a change in the resonance frequency is incidental to the variation of another parameter, such as, e.g., the resonator loss rate, an additional modulation mechanism may be employed to cancel out the undesired modulation of the resonance frequency.) In the following, various exemplary embodiments are illustrated.

In one class of embodiments, the total decay rate $r_{total}$ and the input coupling rate $r_i$ are kept constant, and modulation of the optical output signal is accomplished by complementary variation of an output coupling rate and a loss rate, or of two output coupling rates $r_o$ and $r_o'$ (such that $r_o(t)+r_o'(t)+r_l(t)=$const.), as illustrated in FIGS. 2A-6C. In these embodiments, the photon life time in the resonator is constant. In a second class of embodiments, illustrated in FIGS. 7A-7C, the input coupling rate $r_i$ and the loss rate $r_l$ and/or an output coupling rate $r_o$ are modulated. In this case, the resonator bandwidth changes with modulation, but the cavity still does not incur any transients on resonance as long as $$\frac{\sqrt{2r_i(t)}}{r_i(t) + r_l(t) + r_o(t)}$$

is kept constant.

Figure 2A:
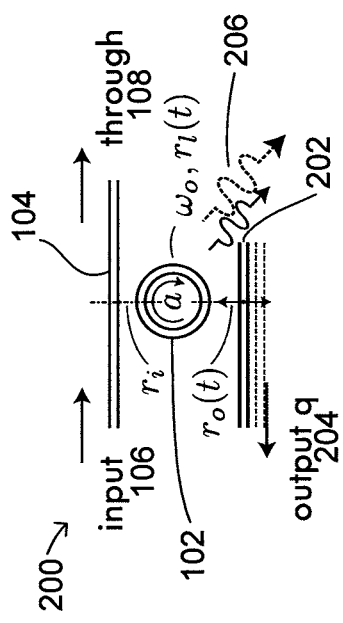
FIG. 2A is a schematic drawing of a resonant optical modulator utilizing simultaneous modulation of the output coupling rate and the resonator loss rate in accordance with one embodiment.
Figure 2B:
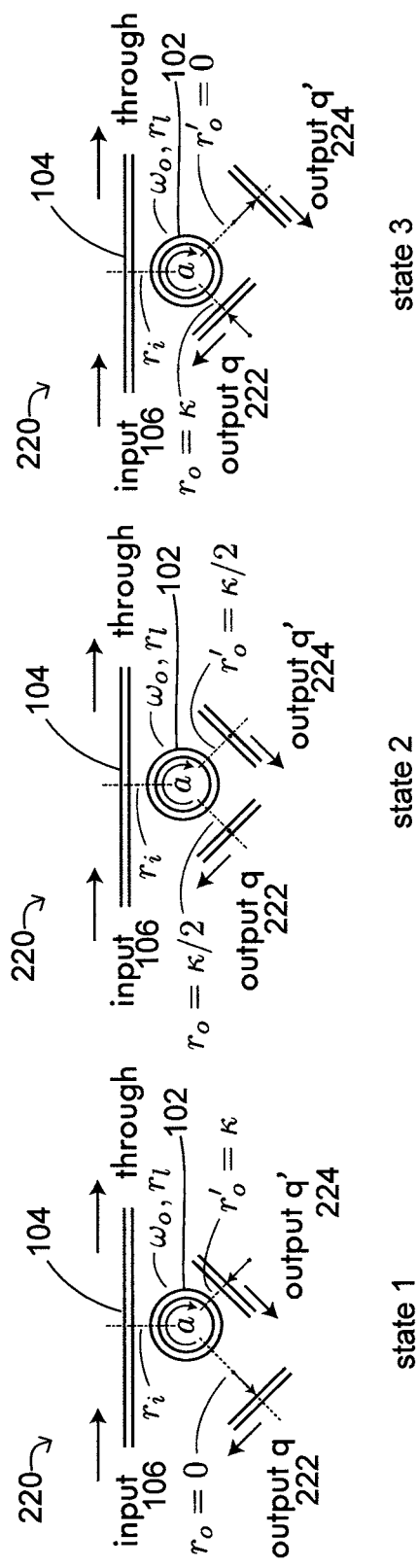
FIG. 2B is a schematic drawing of three states of a resonant optical modulator that utilizes simultaneous modulation of two output coupling rates in accordance with one embodiment.

FIGS. 2A and 2B conceptually illustrate the first class of embodiments. The exemplary modulator 200 shown in FIG. 2A includes a microring resonator 102 coupled to an input waveguide 104 and an output waveguide 202. A constant-intensity light signal enters through an input port 106 of the input waveguide 104, and a modulated output signal exits at an output port 204 of the output waveguide 202, and/or at the through port 108 of the input waveguide 104, depending on the modulation state and the ratio of input and output coupling. In the critically coupled case, i.e., if $r_i=r_o(t)+r_l(t)$, the through port 108 has zero transmission on resonance at all times during modulation. The loss rate of the resonator 102 and the output coupling rate between the resonator 102 and the output port 204 are time-variable. Resonator losses may result, for example, from absorption in the resonator, or from light scattering into the surrounding medium (as symbolically depicted by the arrows 206). The output coupling rate may, in principle, be modulated via the distance between the resonator 102 and the output waveguide 202, i.e., the waveguide 202 may be moved between a closer position (depicted with solid lines) and a farther position (depicted by dashed lines), which correspond to stronger and weaker output coupling, respectively. Coupling modulation by means of physical translation of components may be achieved, for example, with MEMS devices. However, in typical practical implementations, the relative positions between the resonator and waveguide is fixed (as a consequence of manufacturing both in the same substrate, e.g., by means of lithographic micropatterning). The coupling rate may then be modulated by changing the refractive index of the output waveguide 202 and/or the resonator 102, e.g., using the electro-optic or carrier plasma effect.

FIG. 2B illustrates an exemplary modulator 220 with two output ports 222, 224 in three modulation stages. If the resonator 102 is lossless (i.e., $r_l=0$) and critically coupled (i.e., $r_i=r_o+r_o'$), the input signal provided through the input port 106 is fully dropped to the output ports (or drop ports) 222, 224. The coupling rates between the resonator 102 and the two output ports are modulated complementarily; their sum adds up to a maximum coupling rate κ. This is symbolically illustrated with "push-pull mechanisms" in which one output port moves closer to the resonator as the other one moves farther away. In modulation state 1, shown on the left, the first output port 222 is optically completely uncoupled from the resonator and all light is coupled out to the second output port 224. In modulation state 3, shown on the right, the output coupling is reversed, i.e., all light is coupled out to the first port. In the intermediate modulation state 2, both coupling rates are equal to the maximum coupling, i.e., $r_o=r_o'=κ/2$, and light is, accordingly, coupled out equally to both ports 222, 224. The modulation of coupling rates may, again, be accomplished by means other than varying the distance between the resonator and the ports.

Figure 3A:
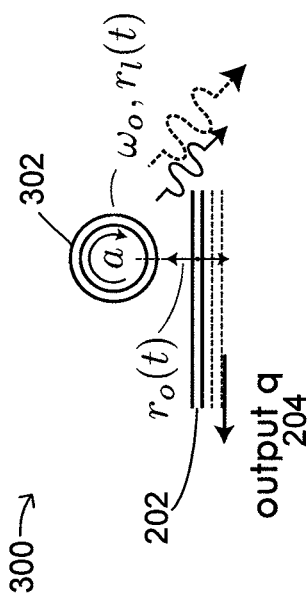
FIG. 3A is a schematic drawing of a resonant optical modulator having a lasing resonant cavity and utilizing simultaneous modulation of the output coupling rate and the resonator loss rate in accordance with one embodiment.
Figure 3B:
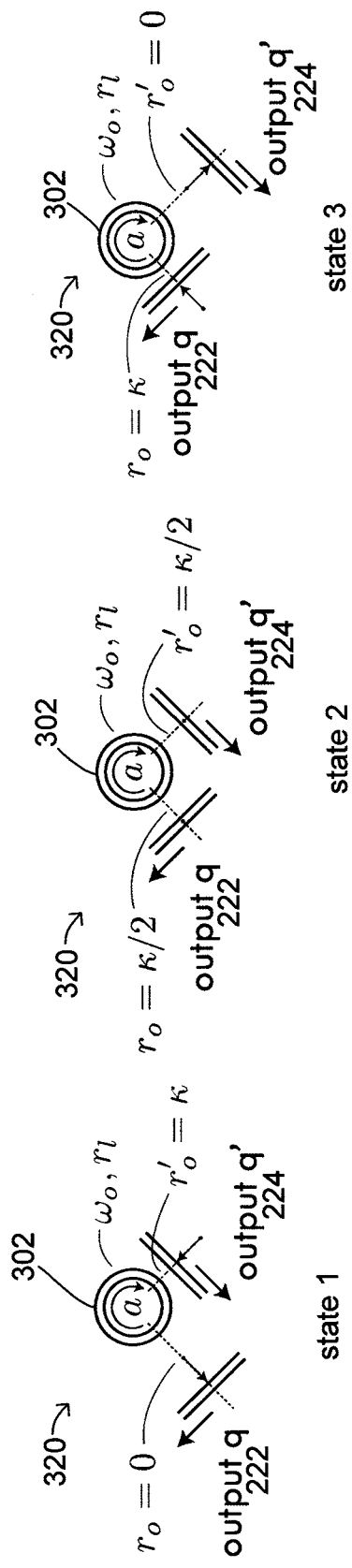
FIG. 3B is a schematic drawing of three states of a resonant optical modulator that has a lasing resonant cavity and that utilizes simultaneous modulation of two output coupling rates in accordance with one embodiment.

FIG. 3A conceptually illustrates an optical modulator 300 with a lasing-cavity resonator 302. Here, light is generated in the resonator cavity itself (e.g., by stimulated emission in a gain medium, optically or electrically pumped). Accordingly, the modulator does not include an input waveguide. The resonator loss rate (which is related to the amplification rate) and the output coupling rate may be simultaneously modulated to generate a modulated output signal at the output port 204 while keeping the photon population in the resonator stable. FIG. 3B shows a modulator 320 with a lasing-cavity resonator 302 that is dynamically coupled to two output ports 222, 224.

Variable coupling rates, as utilized in the modulators 200, 220, 300, 320 described above, may be implemented using Mach-Zehnder interferometers. FIG. 4A illustrates a Mach-Zehnder interferometer 400, which includes two directional couplers 402, 404 with associated coupling (or splitting) ratios $\kappa_1$ and $\kappa_2$, and phase shifters 406, 408 in the waveguides 410, 412 forming the two interferometer arms between the directional couplers 402, 404. The differential phase shift $\Phi_2 - \Phi_1$ between the two waveguides 410, 412, along with the coupling ratios $\kappa_1$ and $\kappa_2$, determines which fraction of light entering at the input port 414 of the first waveguide 410 is transmitted to the output port 416 of the same waveguide, and which fraction is coupled to an output port 418 of the other waveguide 412. For a full-swing 1-to-0 modulation of the output signal at the output port 418, a Mach-Zehnder interferometer with 3 dB couplers 402, 404 requires a full $\pi$ phase shift in the differential phase. The interferometer 400 may include an additional phase shifter 420 at the output 416 to compensate for the phase shift incurred in the interferometer arm.

FIG. 4B illustrates the integration of Mach-Zehnder interferometers 400 into a resonant optical modulator 450. As shown, two interferometers 400 couple light from an elongated ring resonator structure 402, portions of which form the first arms of the interferometers, to two associated output ports 222, 224. A driver 452, which may be an electrical drive circuit, provides drive signals to at least one phase shifter in each of the interferometer arms, thereby facilitating modulation of the output coupling rates. Typically, the driver also provides a third signal to an additional phase shifter 420 in the ring resonator to dynamically compensate for the phase modulation imparted in the Mach-Zehnder interferometers; this is important to suppress change to the phase of the interferometer output that is coupled back into the resonator, which would otherwise result in an undesired modulation of the resonance frequency. FIG. 4C shows a similar optical modulator 460 with interferometric output coupling, which utilizes a lasing resonator 462 instead of an external laser signal.

While a non-resonant Mach-Zehnder-interferometer-based modulator (as shown in FIG. 4A) is energetically costly due to the need for a full $\pi$ phase shift for full-swing modulation, a Mach-Zehnder interferometer used as the variable output coupler of a ring cavity, as shown in FIG. 4B, can be more efficient. Due to the intra-cavity field enhancement on resonance, coupling out a pulse of peak power equal to the power of the input signal requires only modulation between zero output coupling and a coupling power fraction proportional to the inverse finesse, $f = FSR/\Delta f_{3dB}$, of the cavity (where FSR is the free spectral range, and $\Delta f_{3dB}$ is the optical line width) and equal to the input coupling. The intracavity power is f times the input power, and the output power is, accordingly, 1/f times the intracavity power. Thus, the Mach-Zehnder interferometer 400 in the resonant modulator 450 may use a much lower actuation, because a differential phase shift of only a fraction of $\pi$ is needed to create a modulation of the coupling between zero and a small value. A standard broadband Mach-Zehnder interferometer fed with 100 mW, for example, can create 1 mW pulses by modulating the coupling between 0 an 1%. While the other 99% of the power would be lost in a non-resonant modulator, they are recirculated in a cavity-enhanced modulator, resulting in a 100% transfer of power from the input port to the output port at all times (in the absence of resonator losses).

Decoupling the output modulation speed from the optical bandwidth facilitates optimizing the design of the modulator solely for energy and modulation efficiency. Input and output coupling fractions may be decreased in a manner that preserves critical coupling and extraction of power from the input port to the output port(s). Weaker coupling narrows the resonator bandwidth, thus lengthening the photon lifetime and increasing intracavity enhancement. As a result, the smaller output coupling fraction can achieve the same output power as a higher output coupling fraction combined with higher input coupling. In the ideal, asymptotic case (with a lossless cavity), the optical bandwidth and the input and output coupling rates approach zero, and the intracavity enhancement approaches infinity. Therefore, the output couplers need only an infinitesimally small phase shift to achieve full-swing modulation. This means that approaching a single electron per bit (or less) may be sufficient for full-swing modulation, which also implies low actuation voltages and low capacitance, all contributing to low energy-per-bit operation. Accordingly, approaching zero resonator bandwidth allows modulation in principle to approach the ultimate energy efficiency of zero joules per bit.

A number of practical considerations impose a lower bound on the resonator bandwidth. The optical bandwidth is inversely proportional to the decay rate of a resonant signal inside the resonator. Thus, for example, radiation loss due to bending of a waveguide that forms the resonator, absorption loss, or scattering due to surface roughness all impose a minimum usable bandwidth. In practice, linewidths <1 GHz have been achieved in silicon microresonators, and even down to the MHz scales. If one is successful in implementing a very narrow bandwidth—to make an efficient modulator, then at the beginning of operation of the modulator, the cavity also needs on the order of the photon lifetime to optically charge up, which may limit the startup time of the device to ms or μs for long lifetimes. To circumvent this limitation, the cavity may be charged up faster using "optical pre-emphasis." Pre-emphasis means that the a pulse of large modulation is applied first, and then the modulation is brought down to steady state level. Since the lifetime is the time constant at which a step transition is made, a large step modulation will mean a larger change in a certain time. Subsequently backing off on the modulation produces a transition faster than the lifetime. Further, ultra-narrow bandwidths are usually difficult to align in wavelength with a narrow-line continuous-wave source signal. Possible solutions to this problem include the use of thermooptic tuning feedback control, or self-tuning optonanomechanical resonators that self-align with a nearby narrow-line input signal based on light forces (as described, for example, in U.S. patent application Ser. No. 12/262,999, filed on Oct. 31, 2008, the entire disclosure of which is hereby incorporated by reference). Moreover, for finite (i.e., non-zero) cavity loss $r_l$, in order to maintain more than half of the input power transmitted to the modulation, it is necessary to set the maximum coupling rate $r_o$, $r_o'$ of each resonator equal to the loss rate $r_l$, which condition sets a minimum bandwidth.

Figure 4D:
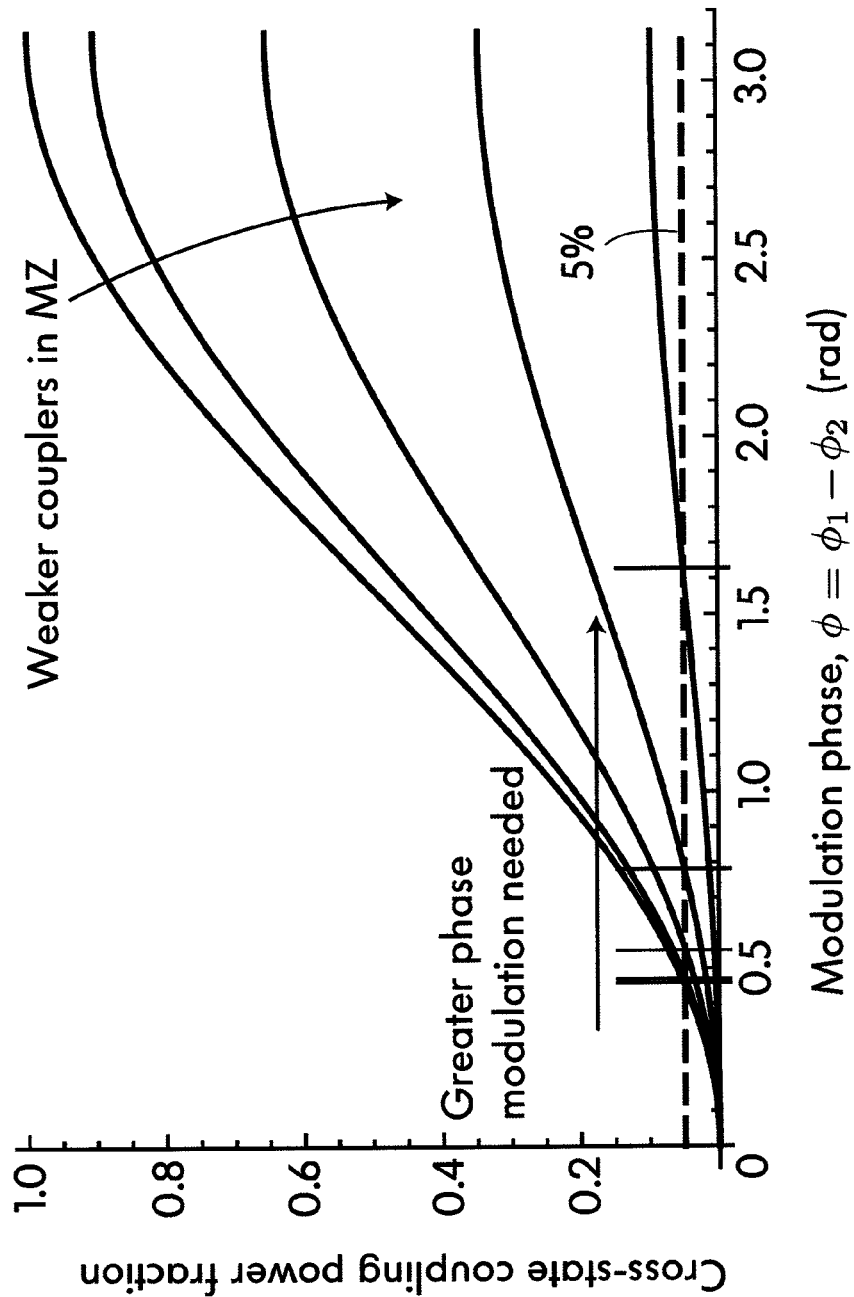
FIG. 4D is a graph showing the coupling power fraction of a Mach-Zehnder interferometer as a function of the differential phase between the two interferometer arms.

An additional source of losses that limit the minimum bandwidth results from radiation scattering associated with the directional couplers 402, 404 of the Mach-Zehnder interferometers 400. In general, these scattering losses are smaller for smaller coupling ratios $\kappa$. The largest losses are incurred with 3 dB couplers. However, there is a tradeoff between achievable losses and the modulation sensitivity. In interferometers with weaker couplers, a $\pi$ phase shift will result in a smaller maximum coupling ratio κ, and, as a result, the sensitivity of the modulator will be reduced, i.e., a larger phase shift will be needed for a set coupling fraction than in an interferometer with 3 dB couplers. This is illustrated in FIG. 4D, in which the coupling power fraction is plotted against the differential phase shift for five coupling ratios between 3 dB and 2.5%. Another drawback of Mach-Zehnder interferometers with non-3-dB couplers is an undesired phase modulation that accompanies amplitude modulation. Along with the coupling ratio, such interferometers modulate the resonance frequency. This problem may be remedied by using two alternating cascaded directional couplers so that their respective phase modulation cancels out, i.e., results in zero total phase modulation. Alternatively, a separate phase modulator may be included in the resonator path to cancel the undesired phase modulation.

Figure 5A:
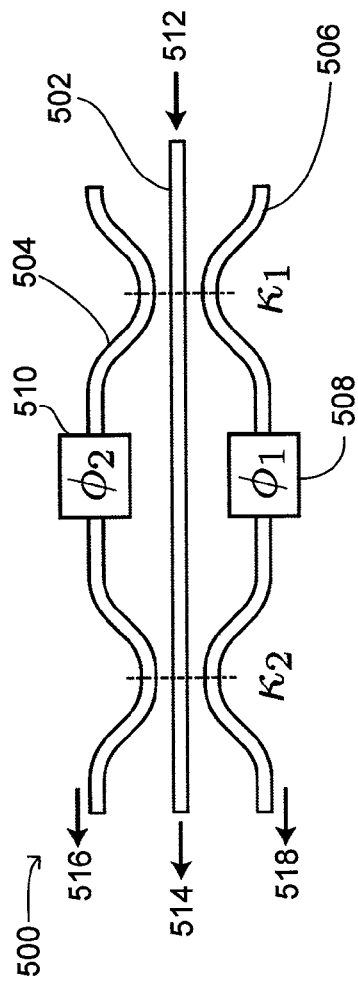
FIG. 5A is a schematic drawing of a three-waveguide interferometer.
Figure 5B:
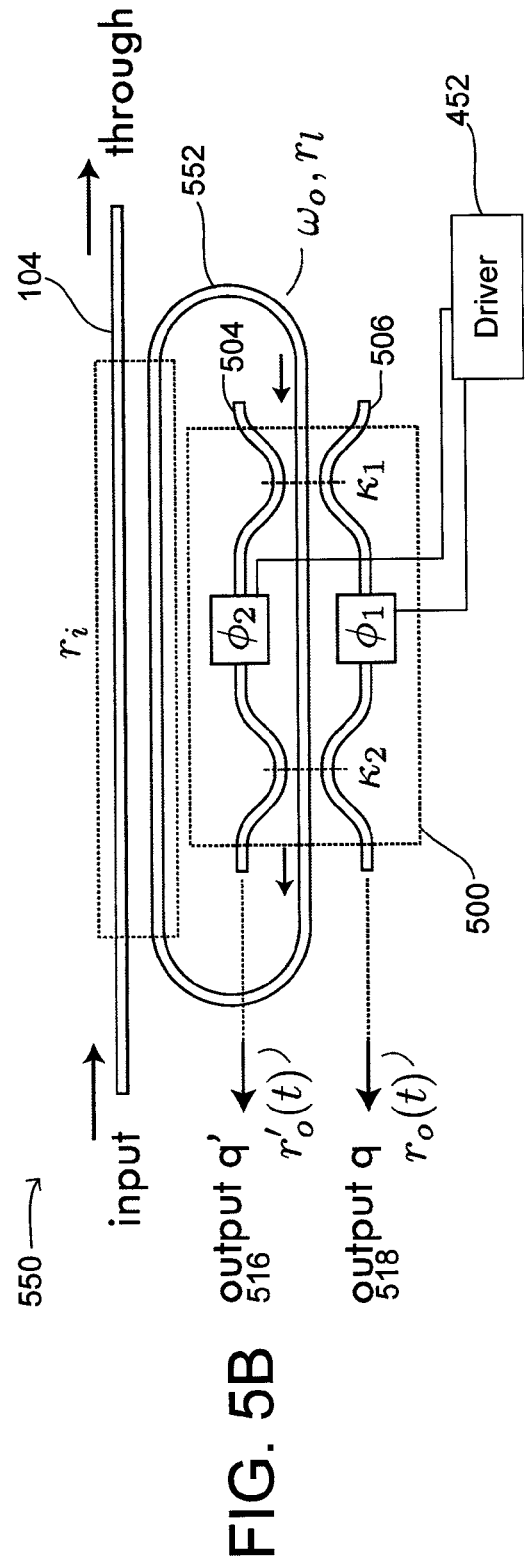
FIG. 5B is a schematic drawing of a resonant optical modulator with two output ports coupled to a ring resonator via a three-waveguide interferometer in accordance with one embodiment.

Instead of using Mach-Zehnder interferometers, the optical modulator may include a three-waveguide interferometer, as shown in FIG. 5A. The three-waveguide interferometer 500 may include a straight center waveguide 502, and two bent waveguides 504, 506 to either side, which are coupled to the center waveguide 502 by two directional couplers with coupling ratios $\kappa_1$ and $\kappa_2$. Between the two directional couplers, phase shifters 508, 510 are placed in the side waveguides 504, 506, respectively. Light coupled into the center waveguide 502 at an input port 512 is partially transmitted to the through port 514 of that waveguide, and partially coupled out to output ports 516, 518 of the side waveguides 504, 506, the fraction in each of the output ports 516, 518 being determined by the differential phase shift between the side waveguides 504, 506. FIG. 5B illustrates the integration of a three-waveguide interferometer 500 into a resonant optical modulator 550. As shown, the center waveguide 502 forms part of the ring resonator 552. A driver 452 controls the phase shifters 508, 510 in the side waveguides 504, 506, thereby modulating the coupling rates to the output ports 516, 518 of the modulator 550.

Figure 6A:
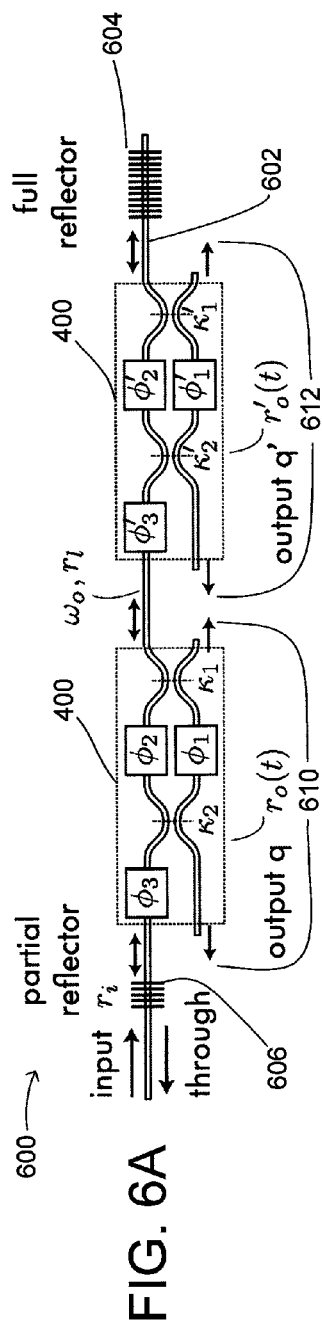
FIG. 6A is a schematic drawing of a resonant optical modulator with two output ports coupled to a standing-wave resonator via Mach-Zehnder interferometers in accordance with one embodiment.
Figure 6B:
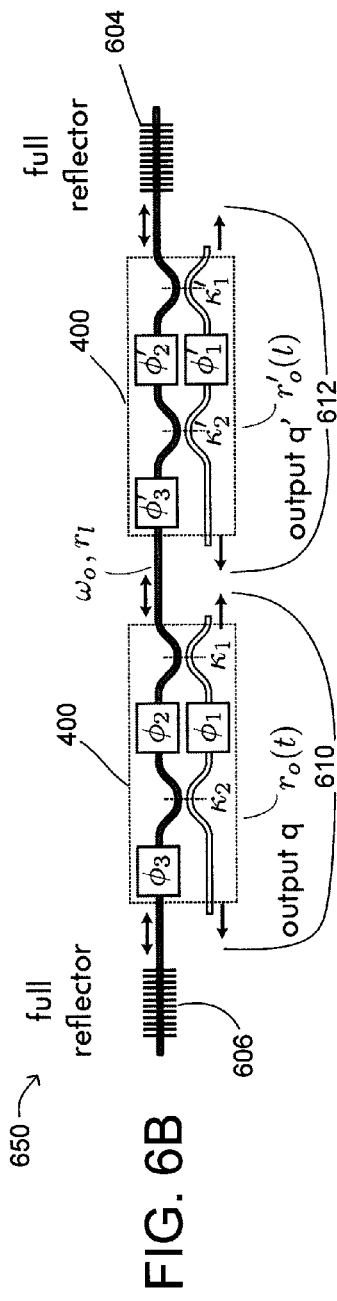
FIG. 6B is a schematic drawing of a resonant optical modulator with two output ports coupled to a lasing standing-wave resonator via Mach-Zehnder interferometers in accordance with one embodiment.
Figure 6C:
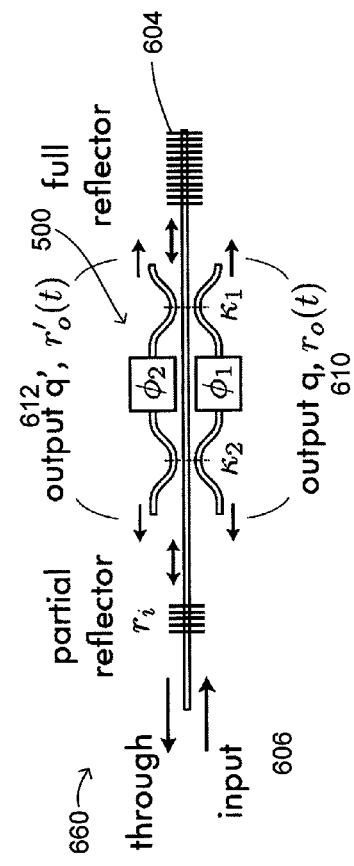
FIG. 6C is a schematic drawing of a resonant optical modulator with two output ports coupled to a lasing standing-wave resonator via a three-waveguide interferometer in accordance with one embodiment.

The embodiments illustrated above all utilize travelling-wave ring resonators. However, resonant optical modulators in accordance with the invention may also be implemented using standing-wave resonators. This is illustrated in FIGS. 6A-6C. As shown in the exemplary modulator 600 of FIG. 6A, a standing-wave resonator may be formed by a waveguide 602 between two reflectors 604, 606 (which may, for example, be dielectric mirrors). One reflector 606 may be only partially reflective, allowing light to be coupled into the resonator through an input port 608. Mach-Zehnder interferometers 400 may again serve as output couplers with variable coupling rates, whose differential phase shifts may be controlled by a driver 452 (not shown). In each interferometer 400, one of the arms will coincide with a section of the resonator waveguide 602, and the other arm will be a waveguide section including the respective output ports 610, 612. Since light travels in the resonator in both directions, each coupler may include two output ports (at both ends of waveguide section that forms the second interferometer arm) with equal associated output coupling rates. FIGS. 6B and 6C illustrate two modifications of the modulator 600 shown in FIG. 6A. The modulator 650 shown in FIG. 6B has a lasing standing-wave resonator, formed by a waveguide that includes a gain medium between two full reflectors. The modulator 660 shown in FIG. 6C utilizes a three-waveguide interferometer 500 to couple light from the resonator to the two output ports 610, 612.

Various embodiments that utilize simultaneous modulation of an input coupling rate and a cavity loss rate and/or an output coupling rate are shown in FIGS. 7A-7C. Such modulators are particularly suited for wavelength-division multiplexing because the modulated signal stays on the same bus waveguide as the other wavelengths that are not resonant and hence pass through unaffected. As a result, many wavelengths may be modulated in one bus by cascading such "through-port-modulating" designs. A modulator 700 that includes an input waveguide 104 coupled to a ring resonator 102 is illustrated in FIG. 7A. Both the input coupling rate $r_i$ and the loss rate $r_l$ of the modulator 700 are time-variable, and may be controlled by a driver (not shown) in a way that ensures constant photon population in the resonator 102. For example, the loss rate $r_l$ may be modulated by carrier injection into the resonator waveguide, and the input coupling $r_i$ may be varied via the distance between the input waveguide 104 and the resonator 102. Alternatively, the modulator may include an interferometer (not shown) for variably coupling light between the input waveguide 104 and the resonator 102. The modulated output signal is provided at the through port 108 of the input waveguide 104.

FIG. 7B conceptually illustrates a modulator 720 in which input and output couplings are simultaneously modulated. Again, the coupling rates between the resonator 102 and the input waveguide 104 and output waveguide 202 may, in principle, be varied via the distances between the coupled components. Alternatively, as illustrates in FIG. 7C, variable couplings may be achieved with interferometers having variable phase shifts. The modulator 740 shown in FIG. 7C couples the resonator 102 to bent input and output waveguides 742, 744 via Mach-Zehnder interferometers. In contrast to the Mach-Zehnder interferometer 400 shown in FIG. 4A, here, the two arms of each interferometer (i.e., the sections between the directional couplers) are of unequal lengths. This facilitates the use of a circular ring resonator 102. This is advantageous because a circular ring has the smallest radiation loss for a given circumference since loss is exponentially dependent on radius; and a small circumference is desirable to obtain a large FSR, while a small radiation loss is desirable to allow for a narrow line width (e.g., filter channel bandwidth). The phase shifts of the interferometers may be modulated by changing the refractive index in regions 746, 748 of the interferometer arms formed by the input and output waveguides 742, 744, using, e.g., the electrooptic or thermooptic effect.

Figure 8A:
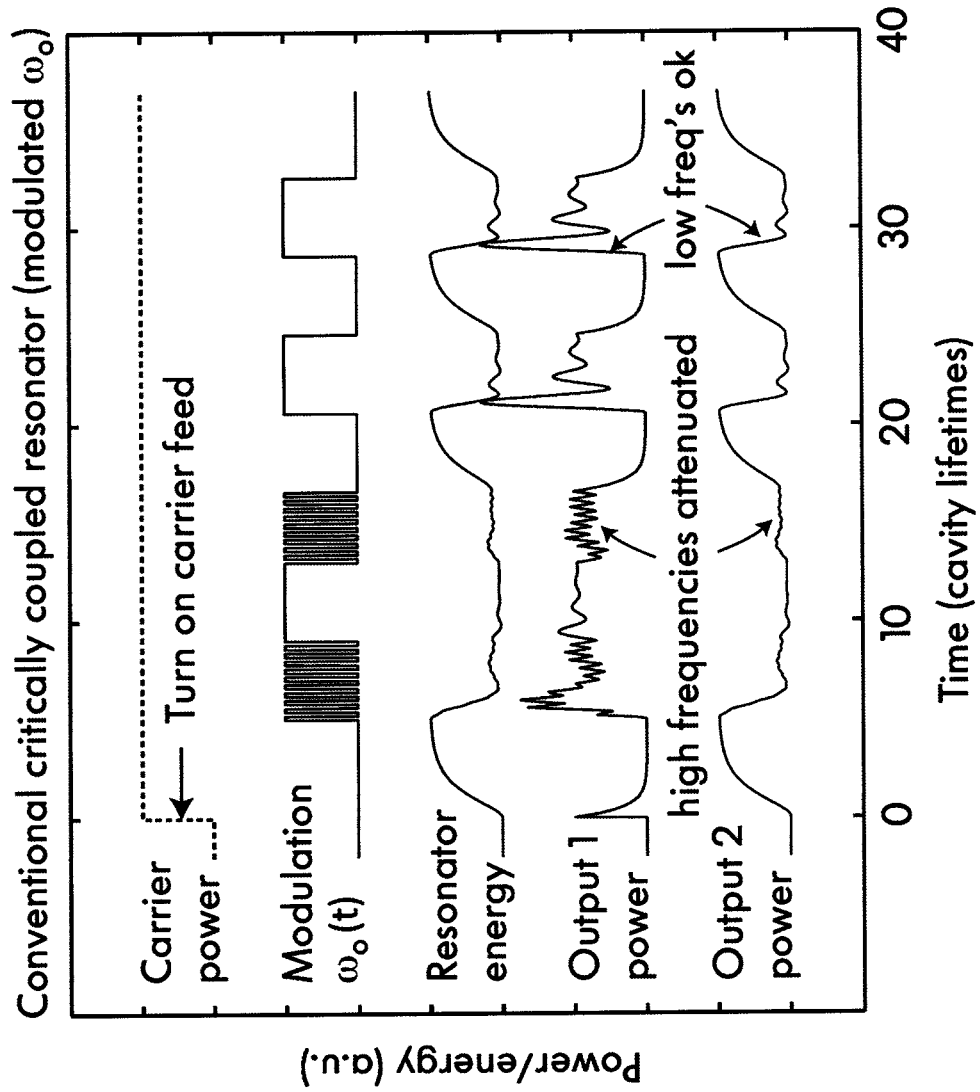
FIG. 8A is a graph illustrating the modulation response of a resonant optical modulator with frequency modulation.
Figure 8B:
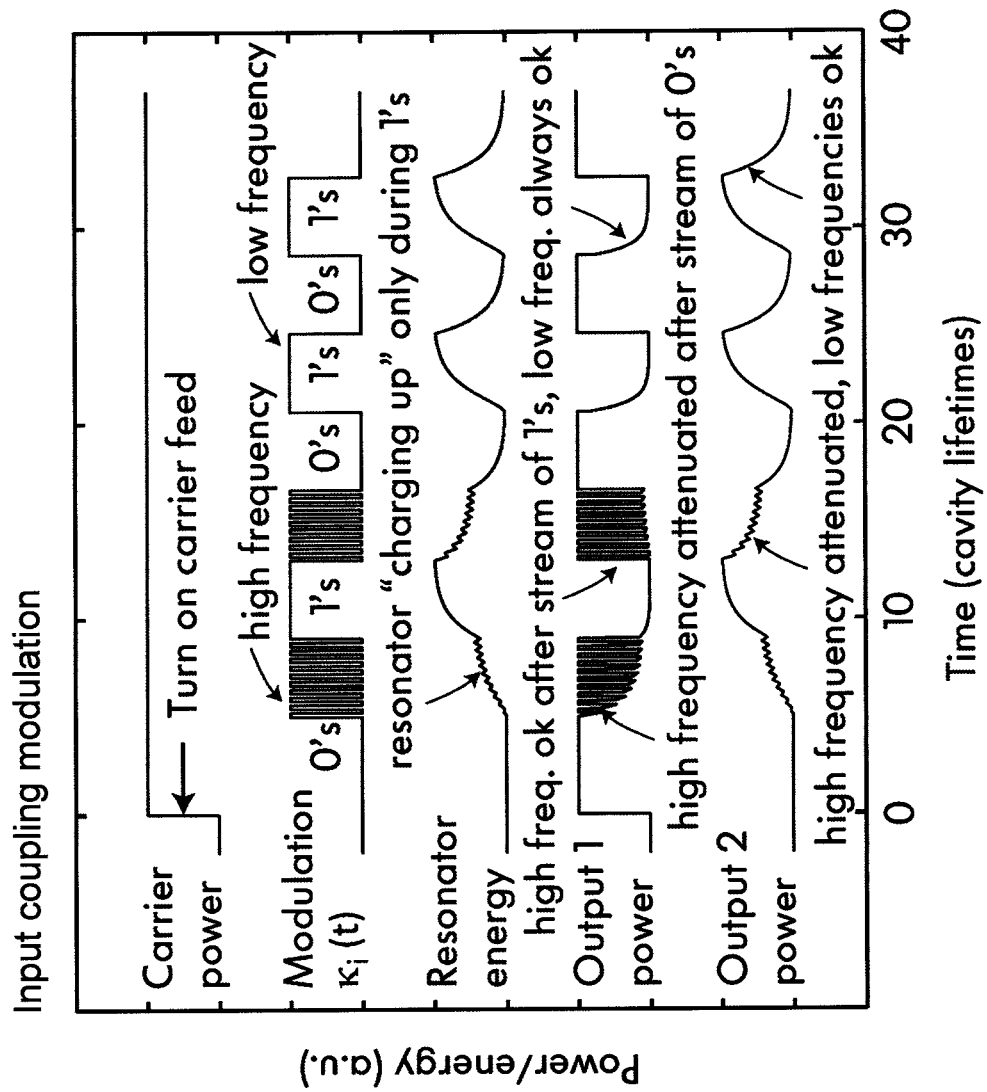
FIG. 8B is a graph illustrating the modulation response of a resonant optical modulator with input coupling modulation.
Figure 8C:
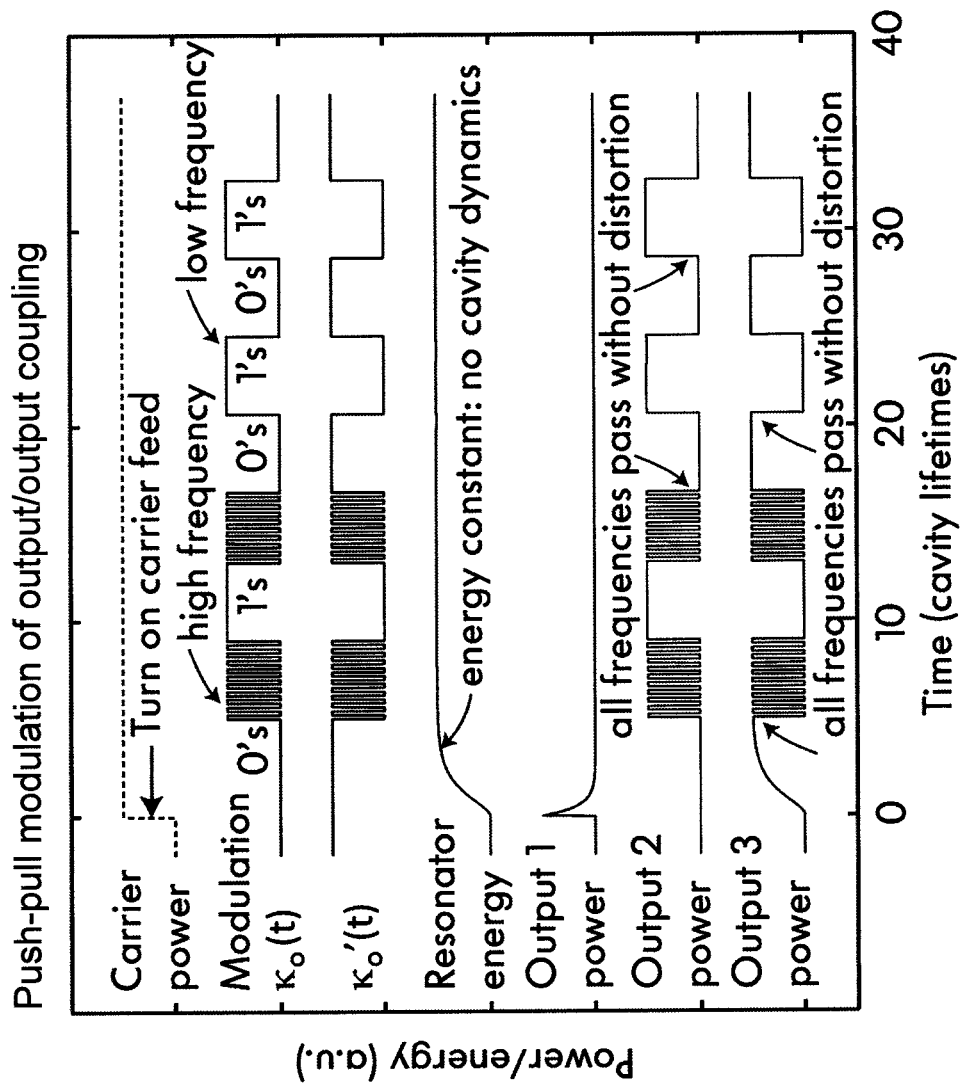
FIG. 8C is a graph illustrating the modulation response of a resonant optical modulator utilizing simultaneous modulation of two output coupling rates in accordance with one embodiment.
Figure 8D:
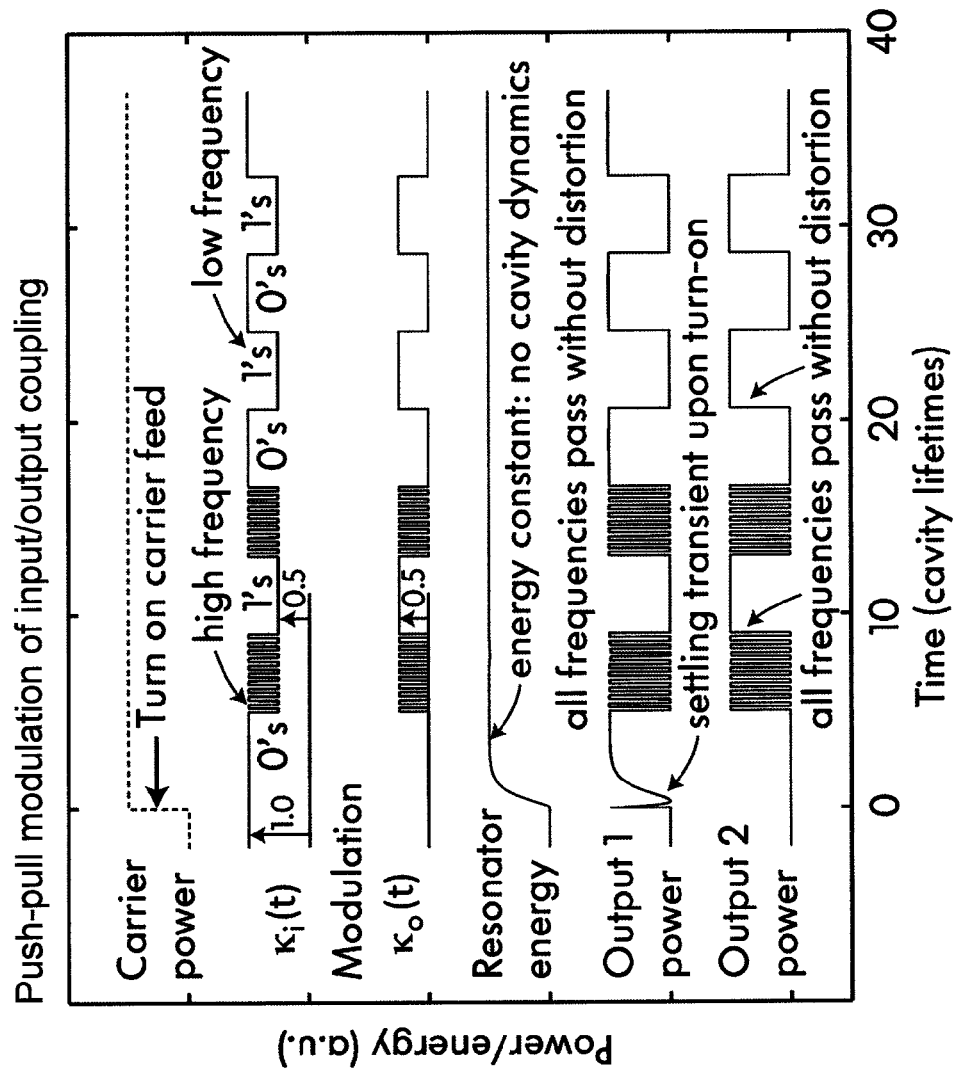
FIG. 8D is a graph illustrating the modulation response of a resonant optical modulator utilizing simultaneous modulation of an input coupling rate and an output coupling rate in accordance with one embodiment.

The modulation characteristics of conventional resonant optical modulators and modulators in accordance with various embodiments of the invention are illustrated in FIGS. 8A-8D. A conventional critically coupled resonant modulator with a wavelength-drop filter and modulated resonance frequency $\omega_0$ attenuates high-frequency modulation as a consequence of cavity dynamics (i.e., of variations in the photon population, or energy, in the resonator) (FIG. 8A). Modulation of the input coupling alone allows high-frequency modulation faster than the cavity lifetime, but still attenuates high frequencies after long streams of zeros (FIG. 8B). Simultaneous modulation of two output coupling rates (FIG. 8C) or input and output coupling rates (FIG. 8D), on the other hand, achieves a flat response at all frequencies independent of cavity lifetime. Both designs can employ ultra-high-Q cavities to approach very low energy operation without distorting the modulated signal at high or low frequencies.

Having described certain embodiments of the invention, it will be apparent to those of ordinary skill in the art that other embodiments incorporating the concepts disclosed herein may be used without departing from the spirit and scope of the invention. For example, while many specific embodiments described herein involve the simultaneous modulation of two modulation parameters, a person of ordinary skill in the art will readily appreciate that three or more parameters may also be simultaneously modulated in a manner that results in constant photon population in the resonator and, thus, achieves advantages of the invention. Accordingly, the described embodiments are to be considered in all respects as only illustrative and not restrictive.

What is claimed is:

1. A resonant optical modulator, comprising:
an optical resonator;
a first port optically coupled to the optical resonator with a first time-variable coupling rate;
a second port optically coupled to the optical resonator with a second time-variable coupling rate; and
a driver for simultaneously modulating the first and second time-variable coupling rates such that a photon population in the optical resonator is substantially constant.

2. The resonant optical modulator of claim 1, wherein a photon lifetime in the optical resonator is substantially constant.

3. The resonant optical modulator of claim 1, wherein each of the first and second ports is an output port.

4. The resonant optical modulator of claim 3, wherein a sum of the first and second time-variable coupling rates is substantially constant.

5. The resonant optical modulator of claim 3, further comprising first and second Mach-Zehnder interferometers coupling the optical resonator to the first and second output ports.

6. The resonant optical modulator of claim 3, further comprising a three-waveguide interferometer coupling the optical resonator to the first and second output ports.

7. The resonant optical modulator of claim 3, further comprising a third port optically coupled to the optical resonator with a third coupling rate, the third port being an input port for receiving an optical input signal.

8. The resonant optical modulator of claim 7, wherein the third coupling rate is substantially constant.

9. The resonant optical modulator of claim 1, wherein the optical resonator comprises an active lasing cavity.

10. The resonant optical modulator of claim 1, wherein the first port is an input port and the second port is an output port.

11. The resonant optical modulator of claim 1, wherein the optical resonator comprises at least one of a ring resonator or a standing-wave cavity resonator.

12. The resonant optical modulator of claim 1, further comprising a nanomechanical actuator for modulating at least one of the first and second coupling rates by modulating a distance between the respective port and the optical resonator.

13. In a resonant optical modulator comprising an optical resonator coupled to first and second ports with first and second coupling rates, respectively, a method for modulating an optical signal, the method comprising:
modulating the first coupling rate so as to modulate an output signal coupled out to the first port; and
simultaneously modulating the second coupling rate such that a photon population in the optical resonator remains substantially constant.

14. The method of claim 13, wherein the second port is an output port.

15. The method of claim 13, wherein the second port is an input port.

16. The method of claim 13, wherein modulating the first coupling rate comprises modulating a phase difference in a Mach-Zehnder interferometer coupling the optical resonator to the first port.

17. The method of claim 13, wherein modulating the first coupling rate comprises modulating a distance between the first port and the optical resonator.

18. A resonant optical modulator, comprising:
an optical resonator having a time-variable loss rate;
a port optically coupled to the optical resonator with a time-variable coupling rate; and
a driver for simultaneously modulating the time-variable loss rate and the time-variable coupling rate such that a photon population in the optical resonator is substantially constant.

19. The resonant optical modulator of claim 18, further comprising a Mach-Zehnder interferometer coupling the optical resonator to the port.

20. The resonant optical modulator of claim 18, wherein the port is an output port.

21. The resonant optical modulator of claim 20, wherein a sum of the time-variable coupling and loss rates is substantially constant.

22. The resonant optical modulator of claim 20, further comprising a second port optically coupled to the optical resonator with a second coupling rate, the second port being an input port for receiving an optical input signal.

23. The resonant optical modulator of claim 22, wherein the second coupling rate is substantially constant.

24. The resonant optical modulator of claim 18, wherein the optical resonator comprises an active lasing cavity.

25. The resonant optical modulator of claim 18, wherein the port is an input port.

26. The resonant optical modulator of claim 18, wherein the optical resonator comprises at least one of a ring resonator or a standing-wave cavity resonator.

27. The resonant optical modulator of claim 18, further comprising a nanomechanical actuator for modulating the coupling rate by modulating a distance between the port and the optical resonator.

28. In a resonant optical modulator comprising an optical resonator having a time-variable loss rate and coupled to a port with a time-variable coupling rate, a method for modulating an optical signal, the method comprising:
modulating the coupling rate so as to modulate an output signal; and
simultaneously modulating the loss rate such that a photon population in the optical resonator remains substantially constant.

29. In a resonant optical modulator comprising an optical resonator coupled to a plurality of ports, at least two of a loss rate of the optical resonator and coupling rates between the resonator and the ports being time-variable, a method for modulating an optical signal, the method comprising:
simultaneously modulating at least two of the rates so as to modulate an output signal while keeping a photon population in the optical resonator substantially constant.

* * * * *